(12) United States Patent
Xie

(10) Patent No.: US 12,552,196 B2
(45) Date of Patent: Feb. 17, 2026

(54) METHOD AND APPARATUS FOR PRODUCING ENGINEERED STONE SLABS

(71) Applicant: SQIP, LLC, Orlando, FL (US)

(72) Inventor: Alex Xie, West Windsor, NJ (US)

(73) Assignee: SQIP, LLC, Orlando, FL (US)

( * ) Notice: Subject to any disclaimer, the term of this patent is extended or adjusted under 35 U.S.C. 154(b) by 0 days.

(21) Appl. No.: 19/055,450

(22) Filed: Feb. 17, 2025

(65) Prior Publication Data

US 2025/0214369 A1   Jul. 3, 2025

Related U.S. Application Data

(63) Continuation-in-part of application No. PCT/US2024/059224, filed on Dec. 9, 2024, and a
(Continued)

(51) Int. Cl.
| | | |
|---|---|---|
| *B44D 5/10* | (2006.01) | |
| *B41J 3/407* | (2006.01) | |
| *B44F 9/04* | (2006.01) | |

(52) U.S. Cl.
CPC ............. *B44D 5/10* (2013.01); *B41J 3/4073* (2013.01); *B44F 9/04* (2013.01)

(58) Field of Classification Search
CPC ....... B28B 1/005; B28B 3/123; B28B 13/022; B28B 13/0225; B28B 13/0295;
(Continued)

(56) References Cited

U.S. PATENT DOCUMENTS

| | | |
|---|---|---|
| 1,735,674 A | 11/1929 | Copeland |
| 9,511,516 B2 | 12/2016 | Xie |
| | (Continued) | |

FOREIGN PATENT DOCUMENTS

| | | |
|---|---|---|
| CN | 1669755 A | 9/2005 |
| CN | 108127767 A | 6/2018 |
| | (Continued) | |

OTHER PUBLICATIONS

Written Opinion of the International Preliminary Examination Authority for PCT/US2024/059224, Apr. 1, 2025. (Year: 2025).*
(Continued)

*Primary Examiner* — William P Fletcher, III
(74) *Attorney, Agent, or Firm* — Harness, Dickey & Pierce, P.L.C.

(57) ABSTRACT

A method for producing engineered stone slabs includes depositing fragments onto a surface and using a height limiting device to disrupt the fragments so a height of the fragments at the highest point from the supporting structure is substantially the same height as the height limiting device from the supporting structure. The method then includes using a digital printing device, in a first digital printing step, to print an image onto at least part of a top and side walls of at least some of the fragments, and then depositing additional composite material onto at least some of the fragments. The method further includes using a digital printing device, in an additional digital printing step, to print an image onto at least part of the additional damp composite material, and then using a press roller to press, flatten and stretch the fragments into a slab.

10 Claims, 24 Drawing Sheets

Related U.S. Application Data continuation-in-part of application No. 18/535,852, filed on Dec. 11, 2023, now Pat. No. 12,226,931.

(58) Field of Classification Search
CPC ..... B29C 67/244; B29C 67/248; B29B 13/10; B29L 2007/002; B44D 5/10; B41J 3/4073; B44F 9/04

See application file for complete search history.

(56) References Cited

U.S. PATENT DOCUMENTS

| | | | |
|---|---|---|---|
| 9,707,698 B1* | 7/2017 | Xie | ............ B28B 1/005 |
| 10,376,912 B2 | 8/2019 | Xie | |
| 10,751,911 B2 | 8/2020 | Toncelli | |
| 10,843,977 B2 | 11/2020 | Xie | |
| 12,226,931 B1 | 2/2025 | Xie | |
| 2008/0079185 A1 | 4/2008 | Jamrussamee et al. | |
| 2015/0042006 A1 | 2/2015 | Kager | |
| 2017/0355101 A1 | 12/2017 | Toncelli | |
| 2018/0126673 A1 | 5/2018 | Sanchis Brines et al. | |
| 2018/0194164 A1 | 7/2018 | Benito Lopez et al. | |
| 2019/0105800 A1 | 4/2019 | Xie | |
| 2019/0143743 A1 | 5/2019 | Kwak et al. | |
| 2019/0201928 A1* | 7/2019 | Xie | ............ B05D 3/12 |
| 2019/0358851 A1 | 11/2019 | Babini et al. | |
| 2020/0282596 A1 | 9/2020 | Qiu et al. | |
| 2021/0229313 A1 | 7/2021 | Rodriguez Garcia et al. | |
| 2022/0024069 A1 | 1/2022 | Stefani et al. | |
| 2022/0048216 A1 | 2/2022 | Toncelli | |
| 2022/0097258 A1 | 3/2022 | Toncelli | |
| 2022/0410427 A1 | 12/2022 | Tarozzi | |
| 2024/0391265 A1 | 11/2024 | Xie | |

FOREIGN PATENT DOCUMENTS

| | | | |
|---|---|---|---|
| CN | 114195479 A * | 3/2022 | ............ C04B 41/009 |
| ES | 2713776 B2 | 12/2019 | |
| KR | 102615745 B1 | 12/2023 | |
| RU | 2765443 C1 | 1/2022 | |
| WO | WO-2005/090034 A1 | 9/2005 | |
| WO | WO-2022/172242 A1 | 8/2022 | |

OTHER PUBLICATIONS

M. Bustillo Revuelta, Construction Materials, Springer Textbooks in Earth Sciences, Geography and Environment, Chapter 4, "Agglomerated Stone," 2021. (Year: 2021).*

* cited by examiner

METHOD AND APPARATUS FOR PRODUCING ENGINEERED STONE SLABS

CROSS-REFERENCE TO RELATED APPLICATIONS

This application is a continuation-in-part of U.S. patent application Ser. No. 18/535,852, filed on Dec. 11, 2023. This application is also a continuation-in-part of International Patent Application No. PCT/US2024/059224, filed on Dec. 9, 2024. The entire disclosure of each of the above applications is incorporated herein by reference.

FIELD

The present application is related to methods and apparatuses for producing engineered stone slabs.

BACKGROUND

This section provides background information related to the present disclosure which is not necessarily prior art.

Quartz is the second most abundant mineral in the Earth's crust and one of the hardest naturally occurring materials. One of its many uses is in "engineered stone". Engineered stone, including quartz, has become a common surfacing and countertop choice in many countries throughout the world. Its applications include kitchen and bathroom countertops, tables and desktops, floor tile, food service areas, wall cladding, and various other horizontal and vertical applications. The production of engineered stone generally involves particulate materials such as ground quartz rock, crushed glass, rocks, pebbles, sand, shells, silicon, and other inorganic mineral materials combined with polymers, binders, resins, colorants, dyes, etc. The particulate material(s) may be varying sizes ranging from four hundred mesh particle size to four mesh particle size with multiple materials of different sizes used simultaneously. The polymer(s) may include agents such as a binder, hardener, initiator, or combination of such. The particulate material(s) and polymers, binders, resins, colorants, dyes, etc. are then mixed resulting in a slightly damp mixture. This initial mixture may be processed through a crushing machine to reduce the size of the combined particles. The resultant, finer mixture may be evenly distributed into a supporting mold, tray, or other supporting structure. The mixture may also be slightly compressed to make the surface of the distributed material flatter and smooth. The mold or tray containing the damp mixture is then moved onto a conveyor belt with a backing sheet, then a processed damp "slab" is moved into a vacuum press machine to compress the material. The compressed material is then placed into a curing machine to be heated into a hardened engineered stone slab. After curing, the hardened slab is generally moved to a grinder to be grinded down to a desired thickness, followed by a polisher to finish the product.

Quartz based stone has many advantages over natural stone such as marble and granite. Compared to these natural stones, quartz is harder, stronger, less water absorbent, and more resistant to staining, scratching, breakage, chemicals, and heat. One of the drawbacks of quartz is its perceived lack of natural, random looking veins and color patterns compared with natural stones.

In the past 10 years, alternative particulate materials have been used in place of quartz or combined with quartz. These alternative materials include material such as cristobalite, feldspar including sintered feldspar, gibbsite or aluminum hydroxide, crushed glass including frit glass, and other minerals and their polymorphs. Any of these fillers may be appropriate to use in place of quartz in the present disclosure.

There are various known methods, apparatuses, and system for producing an engineered stone slab with color patterns and veining similar to natural stone.

In various such known methods, a composite material is mixed which may include or may consist of particulate stone or minerals, quartz, glass, shells, or silicon mixed with polymer resins, dyes, binders, hardeners, initiators, or any combination of such previously mentioned materials. The composite material can vary based on a number of factors such as particulate size, resin percentage, colorants used, or composition. Notably colorant mixtures of resin and colorant, or only colorant in either liquid, powder or other particle format may be considered a composite mixture. This composite material or plurality of composite materials may undergo a process as disclosed in U.S. Pat. No. 10,376,912 B2, which is incorporated by reference herein, to achieve a natural stone aesthetic. Prior to or subsequently, the composite material may undergo further processes such as disclosed in U.S. Pat. Nos. 9,707,698 B1 and 10,843,977 B2 to Xie, which are incorporated by reference herein.

U.S. Pat. No. 9,707,698 B1 by Xie discloses a process in which the composite materials undergo a process consisting of layering, compressing, and disrupting the composite material or plurality composite materials in order to achieve a natural stone aesthetic. The prior art discloses processes in which prior to compressing the composite materials by a manner such as using a press roller, the composite material may be manipulated either by slightly pressing the composite material, disrupting the composite material, or using a gate device in order to scrape any excess material to achieve a layer of a substantially flat or smooth top surface of the composite material.

In the prior art such as US application US20220048216 A1 by Toncelli, it is specifically mentioned that different materials are laid on top of each other on a substantially flat surface. The materials are then pressed or sandwiched together. The material is then folded and pressed again. This will lead to a layer of colorant that is substantially on the same horizontal plane of the material, and not cause any blending or deformation in the vertical direction.

In the prior art such as U.S. Pat. No. 9,707,698 B1 and U.S. Pat. No. 10,843,977 by Xie, the colorant or differently colored composite mixtures are contained within each fragment. Therefore, the vein length after undergoing compression such as through a press roller will not extend to connect various other fragments. This product, formed with this kind of process, may be called a "short veined" slab.

One method to ensure that a significant amount of vertical surface area is coated by colorant is to have a device similar to the one taught by US published patent application no. 2019/0105800, published Apr. 11, 2014, to Xie in which a carving device or a V-shape cutting wheel attached to a CNC controlled by a computer travels through a composite material to form a channel. Subsequently, colorant is deposited onto the channel walls. The drawback to what is taught in US published patent application no. 2019/0105800, which is incorporated by reference is that the devices are meant to carve or cut or slice through the material. This will lead to undesirable and artificial looking straight and clean lines which are exacerbated when passed through a press roller.

One existing method to achieve a realistic pattern similar to natural stone in engineered stone is to decal transfer or digital print a pattern of natural stone to the flattened surface of an engineered stone slab. Using this method, though, the printed surface is easily worn, and the pattern is only on the flattened surface of the slab. In use during fabrication and installation, the exposed side profile will not match the top surface.

In the manufacturing process of engineered stone, the flattened surfaces of the unfinished slabs have a layer ground off in part to obtain a level surface, such as between 1 mm to 5 mm, and are then polished. The amount of material ground off the surfaces of the unfinished slabs depends on production processes and quality control. The current disclosure allows for the production of engineered stone slabs with realistic patterns as found in natural stone, extending vertically (or depth-wise) into the thickness of the slabs (e.g., beyond the flattened top surface, etc.), thereby preserving the patterns, even if a certain thickness is ground off of the flattened top surfaces, by maintaining a through-bodied pattern throughout the thickness (or substantially throughout the thickness) of the slabs.

SUMMARY

This section provides a general summary of the disclosure, and is not a comprehensive disclosure of its full scope or all of its features.

One or more embodiments of the present disclosure provide methods and apparatuses for producing an engineering stone slab, in which the composite material may be significantly varied in fragment size (or fragment size range) in order to achieve a more realistic natural stone aesthetic. These fragments are then squeezed and compressed into a flat uncured slab by a press roller or a pair of press rollers.

In at least one embodiment of the present disclosure, aggregate minerals such as quartz and/or other mineral or glass grits and powder (e.g., raw aggregate materials) may be combined with resin, colorant and other additives in a high-speed mixer to obtain a crushed, damp composite material (e.g., a damp composite mixture of the aggregate minerals, etc.). This crushed, damp composite material (or mixture) may be compressed into a condensed composite mixture as known in the art.

After the known condensed composite material is formed, in at least one embodiment of the present disclosure, the known condensed composite material is broken into a plurality of fragments in a controlled manner such as by a stirring device to disrupt the condensed composite mixture in which the rotational speed of the stirring device may vary so that the faster the stirring device rotates to break the condensed composite material, the smaller the fragments will be. Alternatively, the condensed composite mixture may be dropped onto a rigid grid or sieve. By controlling the rigid grid or sieve size and/or height of the drop, it is possible to obtain fragments of a desired size or sizes (or range of sizes). There are other means of obtaining these desired sized fragments. In either case, the condensed composite material is broken so that resulting fragments having desired sizes (and/or ranges of sizes) may be obtained (e.g., such that about 90% or more of the fragments are about the same size (or are within a same size range), such that about 80% or more of the fragments are about the same size (or are within a same size range), such that about 50% or more of the fragments are about the same size (or are within a same size range), such that about 25% or more of the fragments are about the same size (or are within a same size range), etc.).

These random shaped fragments of composite material are then evenly and/or loosely distributed onto a supporting structure such as a conveyor belt, supporting mold or tray, PET (polyester) film, etc., so that there is not substantially more composite material fragments in one region compared to another. The supporting structure may provide mechanical support so the fragments are contained within a certain area as well as preventing contamination. Ideally there are no regions where smaller fragments are significantly piled up next to a large fragment, thereby blocking the side walls of the large fragment from having colorant deposited onto it. In other words, the fragments are distributed on the supporting structure so that at least some of the side walls of at least some of the fragments (e.g., walls of the fragments not contacting the supporting structure, etc.) are exposed (and/or are free from engagement with other fragments or with side walls of other fragments). In general, any region of square foot should not have 50% more material than another square foot region. In addition, if the random shaped fragments are piled up too high, the pressure may begin to compress the fragments together and lose their shape, especially when the resin content is relatively high in the mixture.

The advantage of processing and depositing the random shaped fragments composite material in this manner is that as additional layers of composite material are added in certain areas such as by spraying colorant onto the previous layers in predefined areas, the colorant will be applied also to some of the side walls of some of the random shaped fragments. These side walls may be random shapes (e.g., jagged shapes, zig-zag shapes, etc.) as opposed to smooth, flat surfaces. This leads to a greater surface area in which the colorant layer is applied compared to a slightly compressed composite material (e.g., a material that is not fragmented and/or that does not have fragments with exposed side walls, etc.) in which the surface of the slightly compressed composite material is substantially flat, or includes crushed fine particles of the mixture, and therefore colorant is only applied to the top surface. The number of random shaped fragments may vary, and the height of the random shaped fragments distributed onto the belt may be greater or much greater than the specified distance between the press roller and the belt, or between a pair of press rollers in an alternative method. Therefore, when the random shaped fragments are fed through the press roller, there will be an accumulation of material at the front of the press roller. The height of this accumulation may be controlled by a number of factors including belt speed, press roller rotational speed, height or average height of the random shaped fragments distributed on the belt, and distance between the press roller and the belt or distance or gap between a pair of press rollers. The random shaped fragments of composite material will be squeezed by the roller or pair of rollers and deformed into one piece to form a flat (uncured) slab once it passes through the roller or pair of rollers. The larger random shaped fragments also have a tendency to be squeezed away from the press roller, and also more towards smaller random shaped fragments, therefore shifting the vein pattern created by the colorant deposited on the side walls of the random shaped fragments.

Notably while covering more surface area of any particular random shaped fragment is desirable, coating more of the side walls, or vertical surfaces, of a random shaped fragment is also important, depending on the desired final design aesthetic. The press roller has a tendency to substantially stretch the composite material in the horizontal direction, but very little stretching in the vertical direction. Therefore, if colorant is only on the top surface of the composite material, or if the composite material is slightly pressed with a flat top surface, the colorant will substantially remain on the top surface after passing through the press roller. For example, if a random shaped fragment has significantly more horizontal surface area such as a flat disc, all the colorant on the top surface of the disc will remain substantially on top after passing through the press roller. This will lead to the colorant appearing on the horizontal top surface of the slab as opposed to having a through bodied appearance in the vertical direction. If however the random shaped fragment is a cylinder with more height than width and colorant is applied throughout the height of the side walls, the colorant on the randomly shaped vertical surface will elongate in the horizontal direction after passing through the press roller and being deformed. The subsequent appearance of the slab will not only have visible colorant veining on the horizontal surface, but also will have random veining through the body of the slab in the vertical direction.

There are other methods aside from press rollers in order to achieve the same effect, such as using pressure to squeeze the composite material through a narrow opening such as in injection molding.

One embodiment of the present disclosure may include a nudging device controlled by CNC (computer numerical control) in which a narrow head is used so that the device does not carve through (or cut through) the random shaped fragments, breaking or compressing them. Rather this device will slightly push (or shift) the random shaped fragments aside and retain their random shape (e.g., it does not break the fragments or disturb the existing shape of the fragments, etc.). An elongated narrow tail made from a flat rigid plate may be attached to the head and oscillate back and forth like a pendulum to further push the random shaped fragments aside, but not push so hard as to deform or break the random shaped fragments. This device forms a channel through the fragments which has a somewhat random edge profile due to the random shape of the fragments pushed aside which are not broken or deformed (e.g., side walls of the fragments are not merged or meshed together but remain exposed and free of contact from part of other fragments, etc.). This allows for a more realistic veining effect once the channel walls are coated with colorant and elongated (e.g., horizontally, etc.) through the press roller. This contrasts with the smooth channel walls formed using a V-shaped cutting wheel type device, or any other form of cutting device that travels through the composite material. After the channels are formed, additional layers of composite material or colorant may be applied to predefined areas that may include the channels. One example of such a method includes use of a spray gun controlled by CNC to deposit colorant on top of certain regions of the random shaped fragments. In this manner the side walls of the randomly shaped fragments that have been moved by the nudging device has colorant deposited onto them. Due to the proximity of each random shaped fragment along the path in which colorant is deposited, the colorant on each random shaped fragment will stretch (e.g., horizontally, etc.) into the adjoining random shaped fragment, simulating the appearance of a continuous long vein in the slab after passing through the press roller or pair of press rollers. Since each random shaped fragment is squeezed and deformed differently, the continuous long vein formed by the depositing of colorant on a series of adjacent particles will have a somewhat random zig zag pattern after the press and stretch process, better simulating the random long veins found in natural stone.

The size of the random shaped fragments is important in controlling the amount of volume that has colorant applied to it. Since the colorant is only deposited on the outer surface of any given random shaped fragment, as random shaped fragment size gets smaller, there is less volume that has the original color of the composite material as opposed to the color of the colorant, until the particle size becomes so small as to change the color of the entirety of the composite material to the color of the colorant. After passing through the press roller the smaller fragments would lead to an undesirable monochrome or short veined appearance.

Another method to ensure that a significant amount of vertical surface area is coated by colorant is to deposit random shaped fragments that are significantly larger than others. The colorant may be applied to the large random shaped fragments prior to or after depositing onto the supporting structure. The location in which each large random shaped fragment is deposited may be controlled or predefined (e.g., preselected based on a mapping of a desired vein pattern to be produced, etc.). This will ensure that a significant portion of the large random shaped fragment's side walls are coated in colorant, and if enough of these large random shaped fragments are close together, after passing through the press roller the random shaped fragments will connect and create a long zig zagged veined effect in the slab.

The larger the random shaped fragment sizes distributed on the belt, or the more random shaped fragments that are piled up in front of the press roller relative to the distance between the press roller and the belt, the more deformed and stretched the composite material will become after passing through the press roller, or a pair of rollers. This will result in elongated veining that is somewhat controllably stretched or deformed depending on how much composite material is piled up in front of the press roller. If not enough composite material is piled up in front of the press roller, the amount the composite material is stretched or deformed will be minimal. To an extreme, if there is not enough material the fragments will not be compressed and exit the press roller as fragments and not a single piece of a flat slab. If too much material is piled up in front of the press roller, the composite material will stretch too much. There is a specific amount of stretching or deformation desired depending on what final design aesthetic is required (e.g., and which may be controlled by a height of accumulation of fragments in front of the press roller, a diameter of the press roller, a rotational speed of the press roller, a distance between the press roller and the support surface (or second press roller below the first press roller), etc.). In addition, the speed of the belt may be increased in order to cause more random shaped fragments to pile up in front of the press roller or slowed down to cause less random shaped fragments to pile up in front of the press roller. The degree of stretching or deformation of the fragments (and colorant added thereto), then, generally controls (or determines) lengths of resulting veins in the compressed material, etc. In addition, the resin amount in the mixture may also affect the degree of stretching (e.g., the more or higher percentage resin in the mixture, the more damp or wet the fragment will be and therefore the easier it is to be stretched or deformed by the press roller or a pair of press rollers; etc.).

The rotational speed of the press roller or pair of press rollers as well as the height between the belt and the press roller or the height between a pair of press rollers (as noted above) will also influence the degree of stretching or deformation of the random shaped fragments of composite material.

In one or more embodiments of the current disclosure, the colorant is deposited along a predefined pattern or track that connects a plurality of fragments by depositing colorant not only on the surface but also along the height of the side walls of the fragments. After depositing the colorant and passing through the press roller, the subsequent elongated through bodied veins will be obtained as a continuous vein in the processed slab.

More than one kind of colorant may be deposited at a predefined region of the fragments of composite material, and the colorant may or may not be deposited at the same time. The amount of each colorant to be deposited may be controlled by computer.

In one or more embodiments of the current disclosure, random shaped fragment size and/or location is controlled in combination with a variety of methods of applying additional layers of composite material or colorant to specific locations in order to coat a desired amount of surface area or vertical surface area of the random shaped fragments. After applying the colorant, the composite material is processed through a press roller, or a pair of press rollers or other similar stretching and compressing device in order to form a desired aesthetic that better simulates natural stone. One or more embodiments of the present disclosure provide an apparatus and device to push fragments aside to expose more surface area or side walls of the randomly shaped fragments while still maintaining the fragment shape and not breaking or deforming the fragments.

One or more embodiments of the present disclosure store and adjust variables in a computer (e.g., in memory of the computer, etc.) to control which colorant, the amount of each of the colorant, which region of the composite material for the colorant to be deposited, and how much the composite material deforms and stretches after passing through one or more press rollers. The distance between the press roller and the belt, or the distance between a pair of rollers, the height and amount of fragments of composite material, and the speed of the belt feeding the press roller may all be controlled in at least one embodiment.

A significant advantage of the present disclosure is the ability to have a continuous run of material as opposed to forming individual, distinct (uncured) slabs one at a time in the color formation process prior to vibration and compaction (and curing) of the slab. In addition to cost savings it may be aesthetically advantageous to produce lengths of slabs longer than a standard slab length (where the standard slab length typically is about 3 to 3.6 meters). This is because if you were to produce a single slab, the degree of stretching present at the front or back of the slab may be significantly different than in the middle since there is not enough material accumulated in front of the press roller at these points. If for example a length of ten uncured slabs were produced continuously (as a single run of material), the material at the front and back of the length of slabs may be discarded and the remainder cut into about 3 to 3.6 meter length increments (having a more consistent veining) for further processing.

Another significant advantage of the present disclosure is the ability to save material cost. It is very difficult to distribute material evenly throughout a large enough format such as the area of a slab, which may be about 1.5 to 2.2 meters×3 to 3.6 meters with an example thickness of 60 mm. The vibration and compaction step may level local regions out, however if one end of the slab has more material than the other end, it is difficult to level. In production the slabs are generally produced thicker than would otherwise be necessary in order to accommodate this unevenness, and grind the slab down to the correct size in a later step in the process. For example, if a final product thickness of 30 mm is desired, a slab thickness of 36 mm may be produced and later grinded and polished to 30 mm, wasting some of the additional 6 mm of material. By using a press roller or similar device to squeeze any excess material flat, it is possible to produce slabs that are much more consistent and flat compared to the prior art, allowing for the production of slabs thinner than 36 mm prior to grinding while still maintaining a final product thickness of 30 mm.

In at least one embodiment, a method for producing engineered stone slabs is provided which includes: crushing and mixing composite minerals/materials, compressing the composite minerals/material to form compressed composite material; fragmenting the compressed composite material into a plurality of fragments of composite material; distributing the fragments of composite material onto a supporting structure; depositing colorant in a predefined region onto at least part of side walls of some of the plurality of fragments of composite material; and using a device to press, flatten and stretch the plurality of fragments of composite material into a slab.

The device used to press, flatten and stretch the plurality of fragments may include a first press roller and a second press roller; wherein the plurality of fragments pass between the first and second press rollers to press, flatten and stretch the plurality of fragments of composite material into the slab.

In at least one embodiment of the present disclosure, a portion of the plurality of fragments with colorant deposited onto them are arranged in a predefined pattern on a supporting structure prior to using the device to press, flatten and stretch the plurality of fragments of composite material into the slab.

In at least one embodiment of the present disclosure, at least a first set of fragments of the plurality of fragments are arranged in a predefined pattern on a supporting structure prior to depositing colorant on the at least first set of the plurality of fragments.

In at least one embodiment, the device which deposits colorant on at least part of the side walls of at least some of the randomly shaped fragments may be a digital printing device similar to an inkjet printer or a dot matrix printer which deposits (e.g., prints, etc.) colorant in specific regions along the length and width of the randomly shaped fragments on the supporting structure (e.g., in accordance with a predefined image of desired veining for the resulting slab(s), etc.). The digital printing device may be controlled by CNC, as described herein.

In at least one embodiment, the device which deposits colorant on at least part of the side walls of some of the randomly shaped fragments may be a digital printing device similar to an inkjet printer or a dot matrix printer, which deposits (e.g., prints, etc.) colorant in specific regions along the length and width of the randomly shaped fragments on the supporting structure.

In connection with the above, an image of natural stone may be uploaded to the digital printing device (e.g., directly or via a computing device in communication with the digital printing device, etc.) whereby the digital printing device may access the image of natural stone. Image processing software may be used to map the image of natural stone to the controls of the printing device so the printing device is able to print the image of natural stone onto the randomly shaped fragments on the supporting structure with the desired resolution (e.g., coordinates of the image are mapped to corresponding coordinates of the supporting structure, etc.). The digital printing device may deposit (e.g., print, etc.) different colored colorants in liquid, powder or particle formats. For instance, in some examples, the digital printing device may include at least one nozzle configured to move in an X, Y, and/or Z direction relative to the supporting structure to thereby deposit desired colorant (e.g., desired colors, amounts, etc.) to the fragments on the supporting structure at particular locations (e.g., based on the uploaded image, etc.). In other examples, the digital printing device may include a row (or rows) of multiple nozzles extending across a width of the supporting structure, whereby particular ones of the nozzles are actuated to deposit desired colorant (e.g., desired colors, amounts, etc.) to the fragments on the supporting structure as the fragments move by (e.g., under, etc.) the nozzles (to thereby deposit desired colorant to the fragments at particular locations) (e.g., based on the uploaded image, etc.). In some embodiments, the digital printing device may be an automated device such that, in response to receiving, accessing, etc. the image of natural stone, the digital printing device automatically prints the different colored colorants in liquid, powder or particle formats onto the fragments, including at least part of side walls of at least some of the fragments on the supporting structure.

In at least one embodiment, the press roller may stretch the image of natural stone printed on the fragments on the supporting structure a certain degree depending on the desired final aesthetic (e.g., where the image of natural stone printed on the fragments on the supporting structure is mimicked from or based on an uploaded image of the natural stone to the device that deposits colorant on the fragments, etc.). To compensate for this, the uploaded image of the natural stone may be processed (or preprocessed) by a computing device (e.g., via computer software such as Photoshop, or AI or other similar software available to the computing device, etc.) so the uploaded image is compressed or distorted, etc. along an axis which aligns with the axis in which the press roller, or a pair of press rollers, stretches the fragments on the supporting structure (e.g., such that the image is distorted/compressed in a length direction or dimension of the slab in the image, etc.). As such, the image printed on the fragments will account for the given degree of stretch caused by the press roller(s). Then, after the image is printed on the fragments, including onto some of the side walls of some of the fragments, and stretched by the press roller, a vein result (in the compressed, uncured slab) that is similar to the original image prior to compression is achieved. It should be appreciated that the resulting veining may not match the original image printed exactly, and that a degree of variation, and randomness and distortion may be present. However, the resulting veining still provides for a more realistic natural stone appearance that previously available.

The digital printing device herein may have a length and width and a nozzle or plurality of nozzles so colorant may be deposited in specific locations along the length and width of the fragments on the supporting structure (via the printing device). Each nozzle may deposit a specific amount of colorant at a specific location and time in order to deposit colorant to print the desired image of natural stone onto the randomly shaped fragments on the supporting structure (e.g., based on the uploaded image as processed, etc.). The computing device (via software included therein) may be used to analyze the image and provide instructions to the supporting structure on how to synchronize the conveyor belt speed, instructions to the printing device for the depositing (e.g., printing, etc.) of the ink or colorants by the printing device on the fragments, and instructions to the press roller to control the degree of stretching by the press roller (e.g., roller speed, spacing from the conveyor belt, etc.). The nozzle or nozzles of the printing device may be set (or adjusted as needed during operation via the printing device) so that the distance between the nozzles and the randomly shaped fragments may be at least about 1 mm from the highest point of the fragments on the supporting structure, and no more than about 120 mm from the lowest point of the fragments on the supporting structure, or otherwise according to the thickness of the slab to be produced. The closer the nozzles are to the surface of the randomly shaped fragments on the supporting structure, the higher the resolution of the print will be. Conversely, the further away the nozzles are to the randomly shaped fragments on the supporting structure, the lower the resolution will be.

In practice, as noted above, whatever image is printed by a digital printing device on at least some of the side wall of some of the fragments will be distorted and stretched after processing through the press roller. This is an expected and desired characteristic of the press roller. In some cases the original image may be distorted beyond recognition by the press and stretch process. In the selection process of what is printed onto the fragments, this effect should be considered and an appropriate image selected that may, after further processing through the press roller, result in desirable coloration, shading and veining that better imitate natural stone.

In at least one embodiment, after the random shaped fragments with at least some coated side walls are pressed, flattened and stretched into an uncured slab by passing through a press roller or a pair of press rollers, a second layer of material may be distributed on top of the uncured slab (where the uncured slab may be considered a first layer). This second layer of material may consist of a translucent or semi-translucent mixture. The mixture may comprise mineral aggregates, crushed glass, resin, colorants, chemical additives, or a combination thereof. The second layer may be distributed or substantially evenly distributed to cover the entire first layer (e.g., before the first layer is cut and/or before the first layer is cured).

In connection with the above, in at least one embodiment, another pair of press roller may be used to press a consistently thick and dense second layer, in preparation for the second layer to be laid on top of the first layer. The second layer may be pressed together with a PET film, or other kind of reinforcing film or reinforcing mesh, on top of it to prevent the material included in the second layer from breaking (before being applied to the first layer), whereby the second layer is then laid evenly on top of the first layer with the PET film still on top of the second layer.

The uncured slab including the first layer with the second layer on top of it may be further processed by vacuum, vibration and compaction as known in the art. The PET film on the top surface of the second layer may be removed after the vacuum compacting process. The amount of material deposited to form the second layer may be controlled so that the after vacuum, vibration and compaction, the height of the second layer may be about 2-8 mm tall. The subsequent slab comprising the first and second layer may then be cured as known in the art.

Subsequently, the majority of the second layer may be removed from the cured slab by evenly grinding off the top surface of the cured slab by a grinding machine. For example, assuming a 2-3 mm tall second layer is formed, about 1.5-2.5 mm may be grinded off. In general, the grinding machine should stop removing material before any of the first layer is grinded off.

Generally, in the processing of engineered stone slabs, after vacuum, vibration and compaction into an uncured slab, the slab is never completely smooth. If a desired finished product with 30 mm thickness is desired, generally a 34 mm-39 mm slab is produced and the slab is ground down to 30 mm to ensure a flat and smooth top and bottom surface.

In connection with the above, the second layer of material added to the uncured slab (as described) acts as a protective layer so when the top of the slab is ground to a flat surface no material, or no substantial amount of material from the first layer is removed during the grinding (to provide a smooth top/bottom surface), preserving the pattern that is printed and subsequently pressed, flattened and stretched on the top surface of the first layer. Due to the translucent or semi-translucent nature of the second layer, the pattern on top of the first layer may be visible therethrough.

The mixture of the second layer may be formulated to be chemically and mechanically/physically compatible with the mixture comprising the first layer. In addition, the colorant may be formulated to be physically and chemically compatible with the composite material used to form the plurality of fragments.

One or more embodiments of the present disclosure provide methods and apparatuses for producing an engineering stone slab, having patterns extending throughout a thickness (or substantially throughout a thickness) of the slab (e.g., a slab having a through-bodied pattern, etc.).

In at least one embodiment, a process may be implemented in which composite material may be placed somewhat evenly on a supporting structure. The composite material may be formed by a process in which the majority of a plurality of randomly shaped fragments are between about 25 mm and about 250 mm as described herein. The composite material or randomly shaped fragments may then pass under a height limiting device which is set at a predefined height above the supporting structure, in a first height limiting step. This height limiting device may slightly press and/or disrupt the top portions of the higher composite material or randomly shaped fragments so that, following this step, the highest point(s) of the composite material or randomly shaped fragments is (are) substantially the same height from the supporting structure as the height limiting device is from the supporting structure. An example distance composite material or randomly shaped fragments may be compressed or disrupted may be about 3 mm-30 mm from the highest point(s). In addition, this height limiting action will reduce the height variation across the composite material or randomly shaped fragments (and/or form plateaus or generally flattened upper surfaces across portions of the composite material or randomly shaped fragments), so that when additional composite material or randomly shaped fragments (and/or colorant, etc.) is/are added at a later step(s), some composite material or randomly shaped fragments will stay on top of the flattened areas formed by the height limiting device and does/do not substantially move or settle to the lower points between the larger pieces of composite material or randomly shaped fragments. Examples of the height limiting device may be a roller configured to disrupt or compress the composite material or randomly shaped fragments or a scraper configured to disrupt or scrape the composite material or randomly shaped fragments. Disrupting may constitute flattening or compressing the composite material or randomly shaped fragments, breaking apart the composite material or randomly shaped fragments, pushing aside the composite material or randomly shaped fragments so higher portions fall to lower positions, or any combination of these actions to ensure the maximum height of the composite material or randomly shaped fragments is set properly.

After passing underneath the height limiting device, in the first height limiting step, the composite material or randomly shaped fragments may then have an image printed thereon by having colorant deposited onto at least some of the flattened upper surfaces and/or onto at least some of the side walls of at least some of the composite material or randomly shaped fragments by a digital printing device in a predefined region in a first digital printing step. The height limiting device ensures that the composite material or randomly shaped fragments is at the appropriate height so that none of the composite material or randomly shaped fragments comes into contact with the nozzle or nozzles of the digital printing device. In addition, this ensures that the distance between the nozzle(s) of the digital printing device and any given point of the composite material or randomly shaped fragments is as small as possible (e.g., is within a desired range, is less than a desired threshold, for example between about 1 mm to 30 mm etc.) as to not negatively affect the resolution of the digital printing. Since the digital printing device is depositing colorant onto an uneven surface, the further the surface is from the nozzle or nozzles of the digital printing device, the blurrier or less resolution the printed region will be.

The composite material or randomly shaped fragments may then have an additional layer of composite material or randomly shaped fragments deposited on top of at least some of the composite material or randomly shaped fragments coated with colorant from the digital printing already on the supporting structure. An example amount of additional composite material or randomly shaped fragments deposited may be about 3%-20% by weight of the initial amount of composite material or randomly shaped fragments initially deposited on the supporting structure. The additional composite material or randomly shaped fragments may be deposited with a majority of the fragments by weight having a diameter of, for example, between about 5 mm-35 mm.

Optionally, after adding the additional layer of composite material or randomly shaped fragments, the composite material or randomly shaped fragments on the supporting structure may pass under another height limiting device which is set at a predefined height above the supporting structure in an additional (or second) height limiting step. This height limiting device may slightly press and/or disrupt the top portions of the higher composite material or randomly shaped fragments so that the highest point(s) of the composite material or randomly shaped fragments is (are) substantially the same height from the supporting structure as the height limiting device is from the supporting structure (e.g., the same height as in the first height limiting step, a different height greater than or less than the height in the first height limiting step, etc.). Examples of the height limiting device may be a roller configured to disrupt and compress the composite material or randomly shaped fragments or a scraper configured to disrupt or scrape the composite material or randomly shaped fragments. Disrupting may constitute flattening or compressing the composite material or randomly shaped fragments, breaking apart the composite material or randomly shaped fragments, pushing aside the composite material or randomly shaped fragments so higher portions fall to lower positions, or any combination of these actions to ensure the maximum height of the composite material or randomly shaped fragments is set properly.

After the additional height limiting step, the composite material or randomly shaped fragments may then have an image printed thereon by having colorant deposited onto at least some of the flattened upper surfaces and/or onto at least part of the side walls of at least some of the composite material or randomly shaped fragments by a digital printing device in an additional digital printing step. The height limiting device ensures that the composite material or randomly shaped fragments is at the appropriate height so that none of the composite material or randomly shaped fragments comes into contact with the nozzle or nozzles of the printing device. In addition, this ensures that the distance between the nozzle(s) of the digital printing device and any given point of the composite material or randomly shaped fragments is as small as possible (e.g., is within a desired range, is less than a desired threshold, etc., for instance, from about 1 mm to 25 mm) as to not negatively affect the resolution of the printing. Optionally, this additional printing step may print substantially the same pattern or design as the first printing step, so the same region of the different layer of the composite material or randomly shaped fragments has the same colorant or image.

In this manner, at least some portions of the additional composite material or randomly shaped fragments deposited on the supporting structure may have colorant deposited underneath and on top of it by a printing device or devices, in addition to coating at least part of the side walls (e.g., colorant may be located between layers of composite material or randomly shaped fragments, etc.). This process of height limiting the composite material or randomly shaped fragments, depositing additional composite material or randomly shaped fragments, optionally again height limiting the additional/added composite material or randomly shaped fragments, and depositing colorant on at least some of the additional composite material or randomly shaped fragments may be repeated as many times as required by the desired detail of each layer and final aesthetic of the finished slab.

Following the above, the composite material or randomly shaped fragments, along with the digital printing (e.g., colorant, etc.) on them, may then be pressed, flattened and stretched into an uncured slab by means of a press roller or pair of press rollers as described herein. The uncured slab may then be cured as also described herein.

It should be emphasized that, in example embodiments, the composite material used herein (e.g., placed on the supporting structure, etc.) is originally formed by a combination of dry sand, dry powder, resin and other additives stirred by a high-speed mixer to form the composite material. The composite material may then be compressed and controllably fragmented into randomly shaped fragments of a desired size range (as described herein). If the randomly shaped fragments are stacked together for a period of time, the randomly shaped fragments will be affected by gravity and bonded together to form a pile of composite material. Therefore, there is a limit to the working time after obtaining the composite material or randomly shaped fragments.

As a comparison, in the kneading of dough (e.g., in baking, etc.) one may coat the surface of the dough with oil and colored seasoning. As the dough continues to be kneaded, the oil and colored seasoning coated on the surface of the dough will eventually knead throughout the dough in and out. If kneaded long enough, the dough will become a monochrome color. If it is not kneaded too long, there will be random patterns of the oil and colored seasoning, and some gradient color transition throughout. The smaller the dough, the faster and easier the oil and colored seasoning coated on the surface of the dough will mix from the outside of the dough during kneading.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Figure 1:
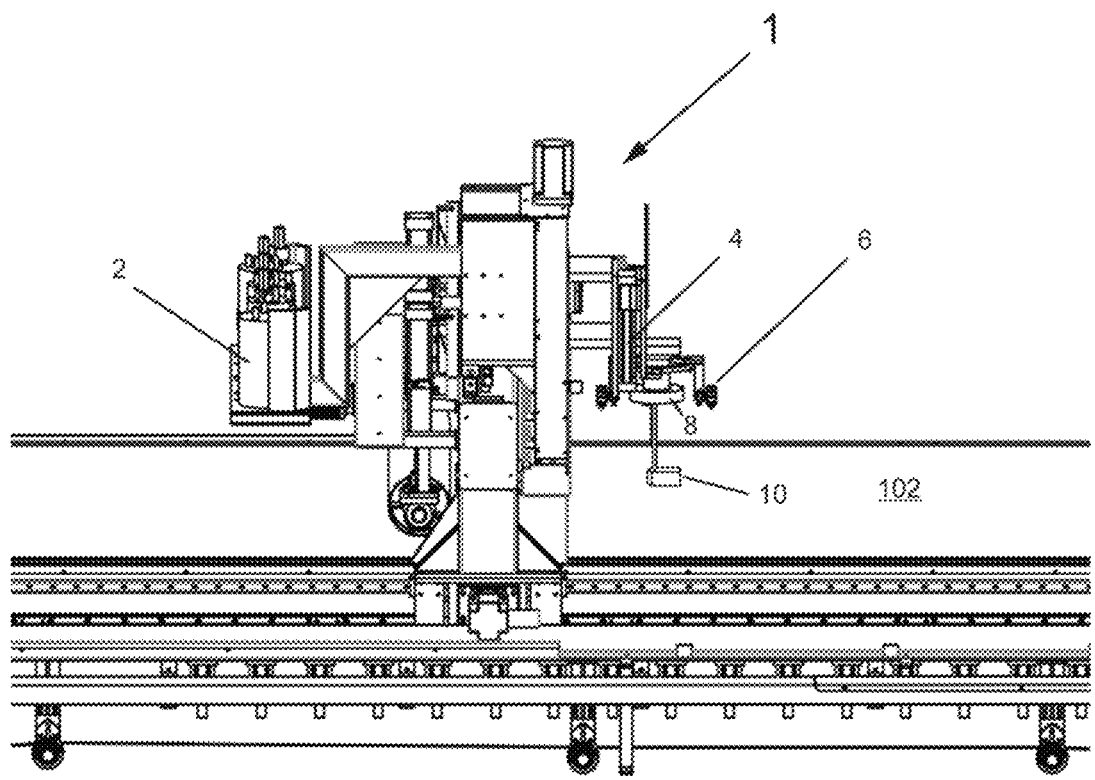
FIG. 1 is a perspective view of part of a first apparatus in accordance with an embodiment of the present disclosure.
Figure 3:
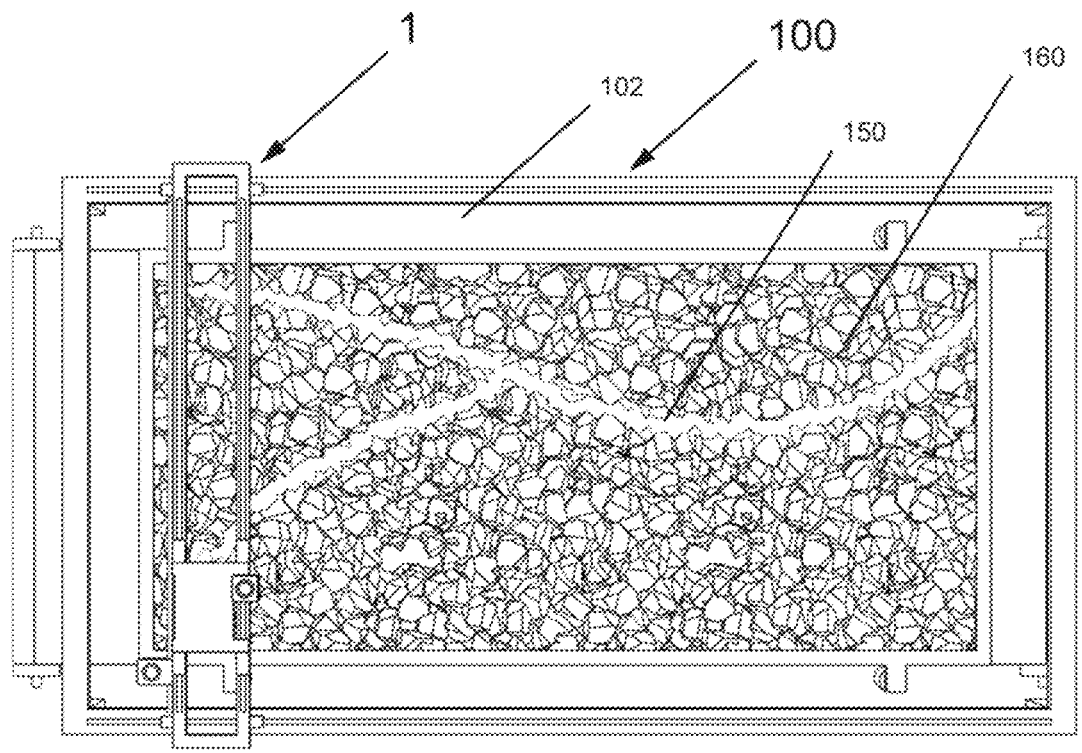
FIG. 3 shows a simplified top view of the first apparatus, which is partly shown in FIG. 1, in a state where a nudging device of the apparatus has formed a channel in a composite material while retaining a random shape of side walls of fragments.

FIG. 1 is a perspective view of part of a first apparatus 1, which is shown in FIG. 3, in accordance with an embodiment of the present disclosure.

Figure 2:
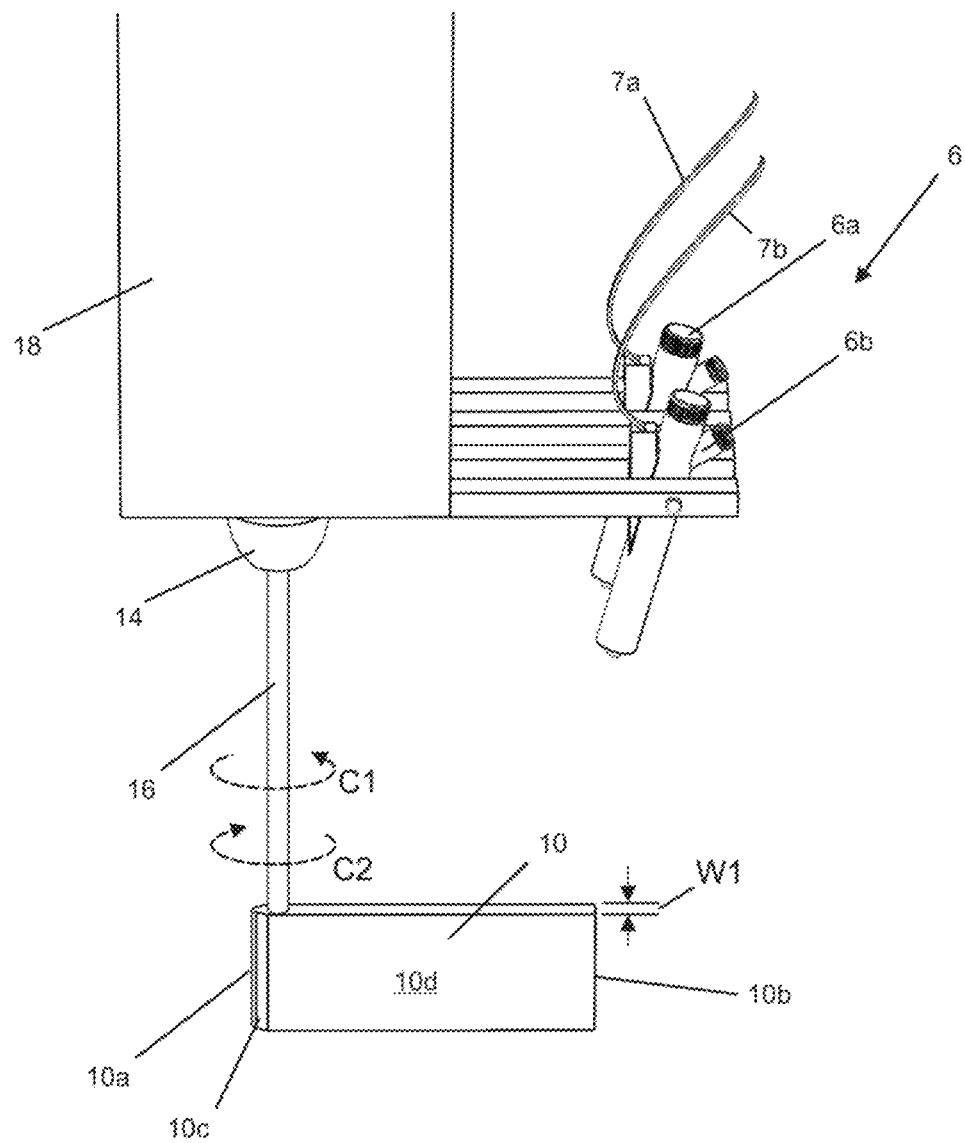
FIG. 2 shows a close up simplified perspective view of a portion of the first apparatus of FIG. 1.

FIG. 2 shows a close up simplified perspective view of a portion of the first apparatus 1. As shown in FIG. 2, the apparatus 1 includes motor 18, member 14, shaft 16, nudging device 10, and spray device 6. The spray device 6 includes tubes 7a and 7b which feed spray nozzles 6a and 6b, respectively. The shaft 16 is configured to be rotated by motor 18 and member 14 in the directions C1 (counterclockwise) or C2 (clockwise) to rotate the nudging device 10 about the shaft 16.

FIG. 3 shows a simplified top view of the first apparatus 1, in a state where a nudging device 10 of the apparatus 1 has formed channels 150 in a composite material 160 while retaining a random shape (e.g., a zig-zag shape, etc.) of side walls of fragments of the composite material 160 (e.g., where at least part of the side walls of some of the fragments are exposed and are not in contact with side walls of other fragments, etc.).

Figure 4:
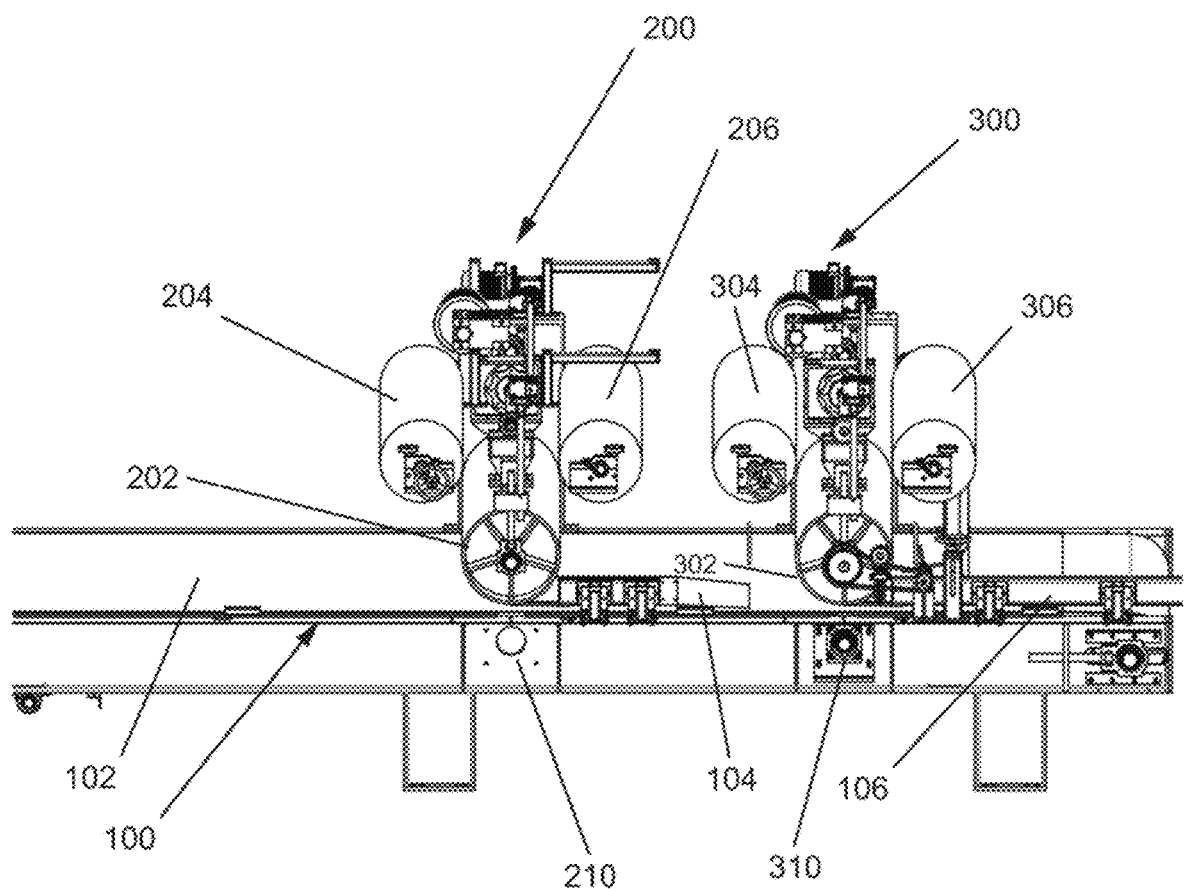
FIG. 4 shows a perspective view of a second apparatus in accordance with an embodiment of the present disclosure.

FIG. 4 shows a perspective view of a second apparatus in accordance with an embodiment of the present disclosure, wherein the second apparatus includes a press roller device 200 and a press roller device 300. The press roller device 200 includes a press roller 202 and bottom press roller 210 and the press roller device 300 includes a press roller 302 and bottom press roller 310. The press roller device 200 also includes film remover 204 and film dispenser 206. The press roller device 300 also includes film remover 304 and film dispenser 306.

Figure 5:
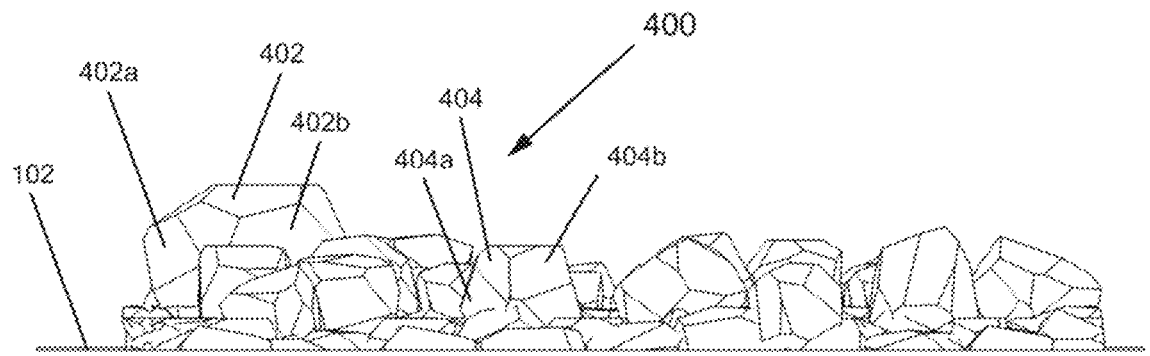
FIG. 5 shows a simplified side view of a composite material demonstrating various fragment sizes and random orientations of the sides of the fragments.

FIG. 5 shows a simplified side view of a composite material 400 demonstrating various fragment sizes and random orientations of the side walls of the fragments. The composite material 400 includes a plurality of fragments including fragment 402 and fragment 404. The fragment 402 has side walls 402a and 402b, and the fragment 404 has sides including side walls 404a and 404b. The side walls 402a, 402b, 404a, and 404b are oriented differently with respect to the conveyor belt surface of conveyor belt 102. The fragments (including fragments 402 and 404) are formed from a mixture (or from different mixtures or batches of mixtures) of raw materials that have been previously compressed (e.g., as part of a first compressing operation, etc.) and then fragmented. The resulting fragments, then, include fragments 402 and 404. In connection therewith, fragments 402 and 404 may be from the same compressed mixture of raw materials (that has been fragmented). Or fragment 402 may be from a first compressed mixture of raw materials (that has been fragmented to form fragments having a first size or first range of sizes) and fragment 404 may be from a second compressed mixture of raw materials (that has been fragmented to form fragments having a second size or second range of sizes different from the first size or first range of sizes). In the later, then, the fragments from the first and second compressed mixtures of raw materials (including fragments 402 and 404, respectively) are combined to form the composite material 400 of fragments.

Figure 6:
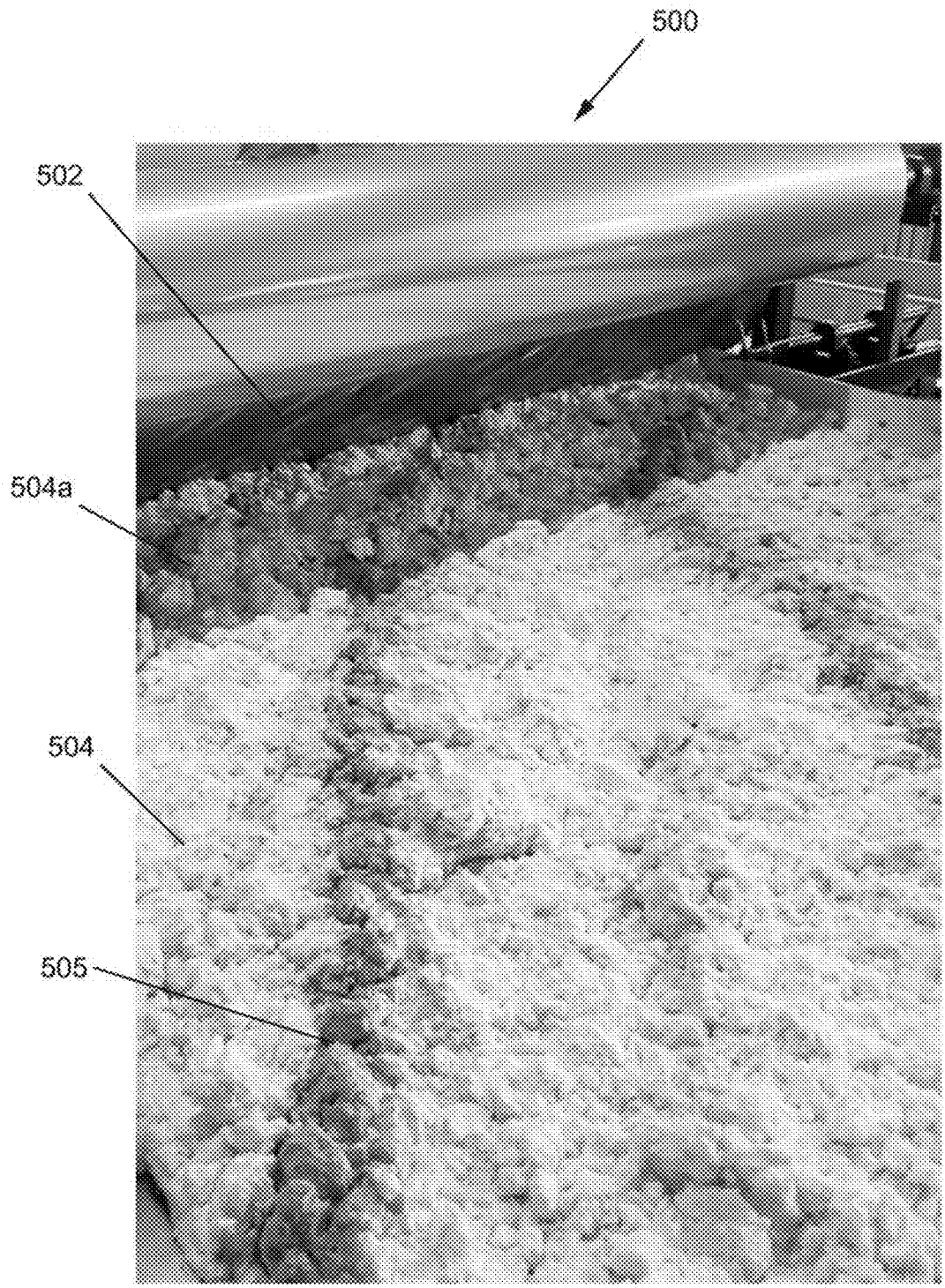
FIG. 6 shows a picture of fragments after a track of colorant has been applied as the fragments enter a press roller, and the extra amount of piled up fragments right in front of the press roller.

FIG. 6 shows a photograph 500 which shows fragments 504 after a track of colorant has been applied, and before the fragments enter a press roller 502. A region 504a of fragments 504 is identified where the fragments of region 504a are "piled up" or "accumulated" in front of the press roller 502. As described above, the fragments 504 may be obtained from a mixture (or from different mixtures or batches of mixtures) of raw materials that have been previously compressed (e.g., as part of a first compressing operation, etc.) and then fragmented. In this example, the fragments 504 (and the colorant applied thereto), then, are compressed (e.g., as part of a second compressing operation, etc.) by the press roller 502.

Figure 7:
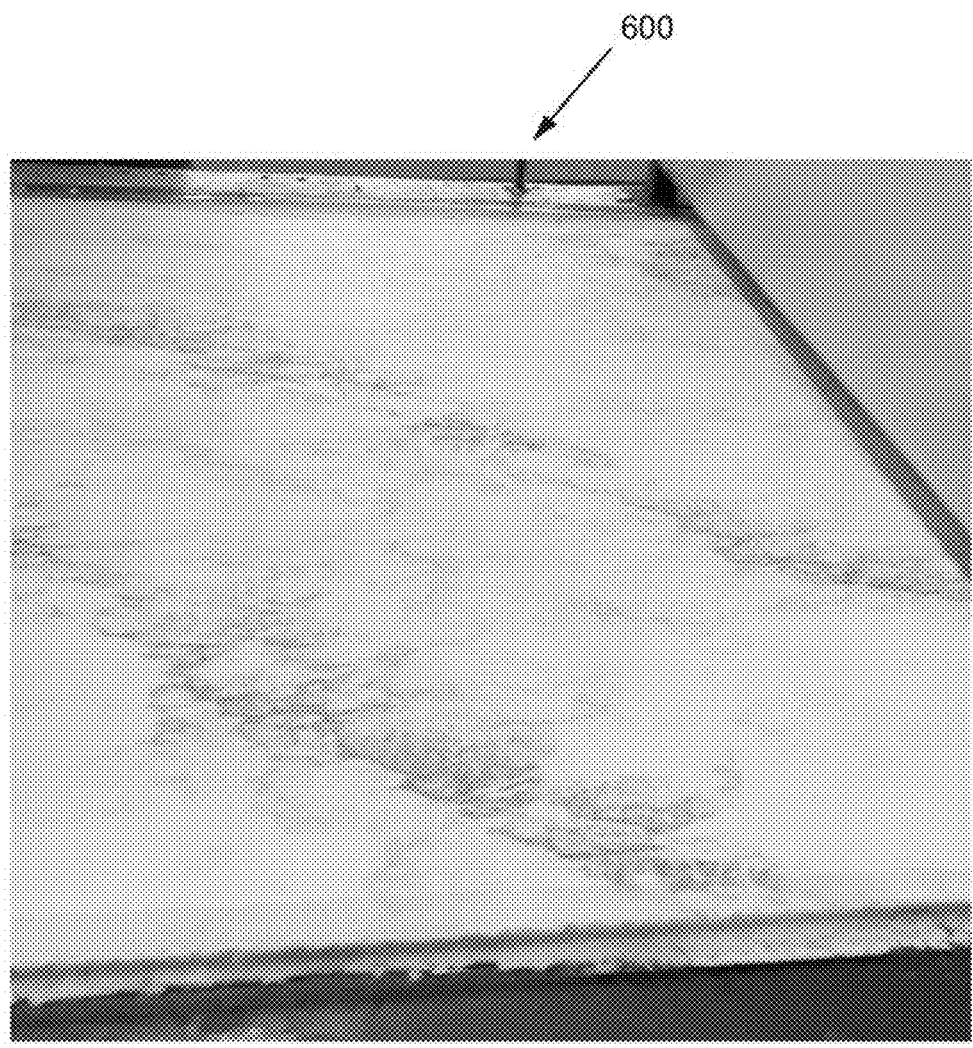
FIG. 7 shows fragments as they exit a press roller in which the fragments have been pressed together into one piece to form a flat slab, in which the fragments have been deformed and stretched, creating zig zagging through bodied veins in the slab.

FIG. 7 shows fragments 600 as they exit a press roller in which the fragments have been pressed together as part of a continuous one piece of a slab, and flattened and stretched (and prior to curing of the slab).

Figure 8:
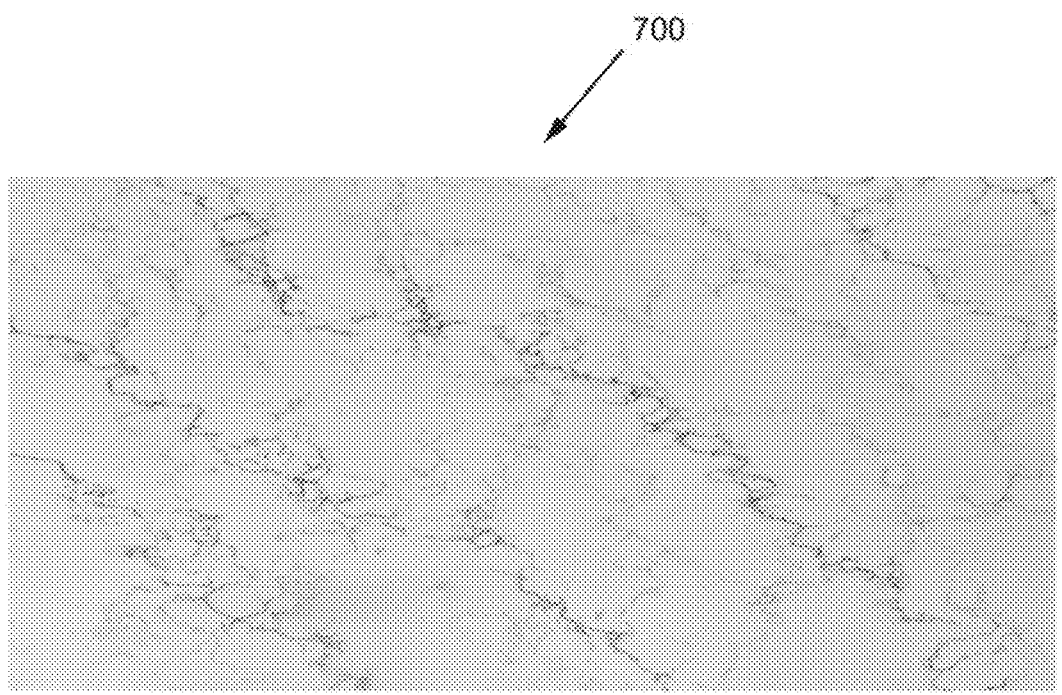
FIG. 8 shows a finished slab after trimming, grinding and polishing and undergoing the processes shown by FIG. 6 and FIG. 7.

FIG. 8 is an image 700 of a finished slab after compacting, curing, trimming, grinding and polishing and undergoing the processes shown by FIG. 6 and FIG. 8.

Figure 9:
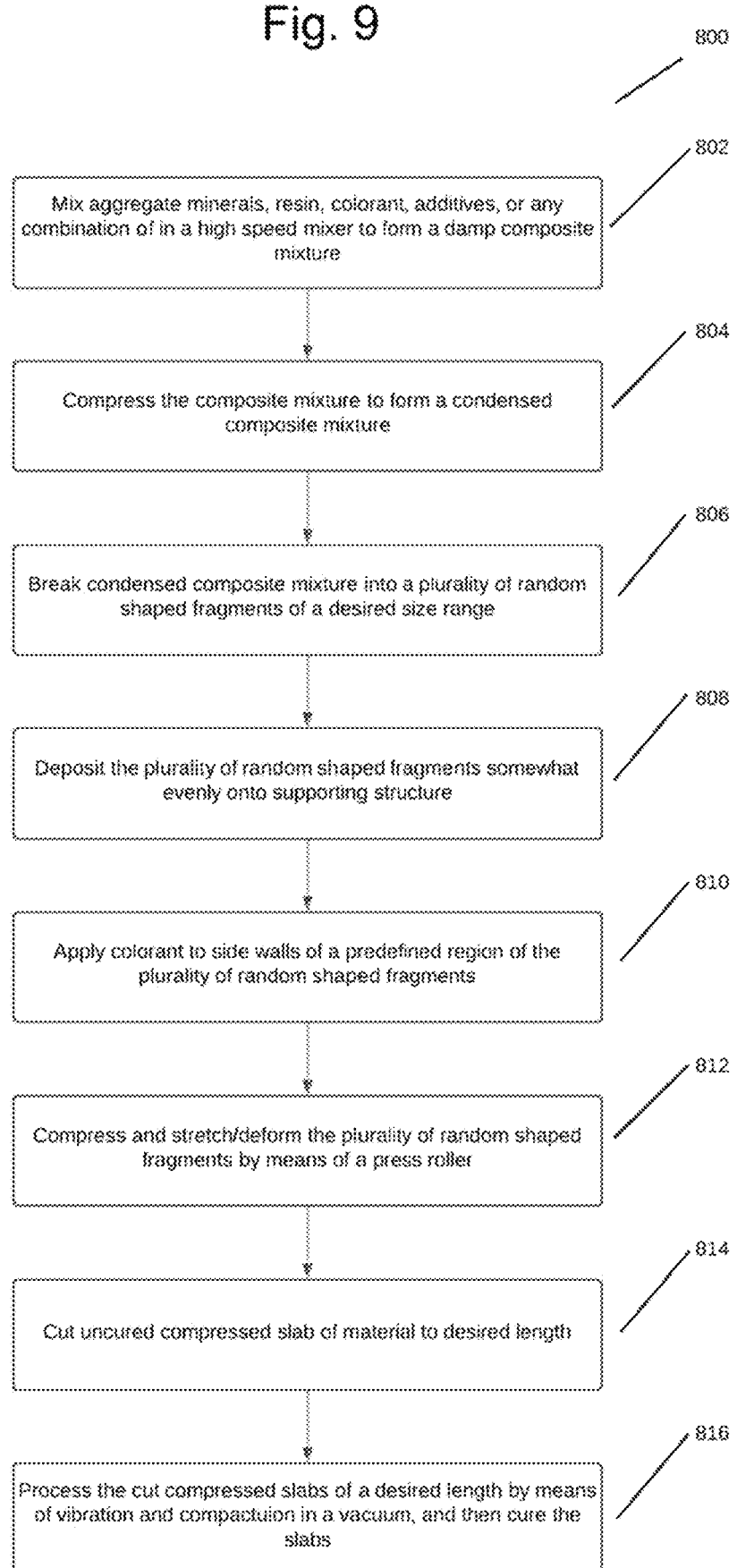
FIG. 9 shows a flow chart of a method in accordance with an embodiment of the present disclosure.

FIG. 9 shows a flow chart 800 of a method in accordance with an embodiment of the present disclosure.

Aggregate minerals such as quartz grits and powder (e.g., raw aggregate materials, etc.) may be combined with resin, colorant and other additives in a high-speed mixer to obtain a damp composite material (or damp composite mixture of the aggregate minerals) at step 802. This composite material (or mixture) is compressed (e.g., via rollers, etc.) into a condensed composite mixture at step 804 (e.g., as part of a first compressing step, etc.). In some examples, the condensed composite mixture does not include colorant or does not have colorant added thereto as veins (whereby colorant is later added as described herein).

At step 806 of FIG. 9, a condensed composite mixture (e.g., the condensed composite mixture from step 804) is broken up into a plurality of fragments. The breaking up of the condensed composite mixture into a plurality of fragments is preferably done in a controlled manner such as by a stirring device to disrupt the condensed composite mixture in which the rotational speed of the stirring device may vary so that the faster the stirring device rotates to break the condensed composite material, the smaller the fragments will be.

Alternatively, the condensed composite mixture may be dropped onto a rigid grid or sieve to break the condensed composite mixture into chunks or random shaped fragments of composite material. By controlling the sieve size and/or height of the drop, it is possible to obtain a majority of fragments comprised of a desired size or size range.

There are other means of obtaining the plurality of fragments.

In some examples, multiple "batches" of the condensed composite mixture may be formed (at steps 802 and 804). A first batch of the condensed composite mixture, then, is broken into a plurality of fragments (e.g., at step 806) such that a majority of the resulting fragments fall within a desired first size range. Additionally, a second batch of the condensed composite mixture is broken into a plurality of fragments (e.g., at step 806) such that a majority of the resulting fragments fall within a desired second size range (which is different from the first size range). Further batches of the condensed composite mixture may also be broken into a plurality of fragments (e.g., at step 806) such that a majority of the resulting fragments fall within a desired third, fourth, etc. size range (which is/are different from the first, second, etc. size ranges). In this way, different desired sizes of fragments may be formed from the condensed composite mixture (and subsequently used to form slabs as described herein).

Fragment size may vary depending on the desired final aesthetic, however, each three dimensional fragment of the plurality of fragments referred to in step 806 may be described as having a width, length, and height, and the largest dimension of the width, length, and height preferably ranges between 25 mm and 250 mm. The size of the fragments to be formed/used is determined by the amount of veining desired on the final aesthetic. In general, the larger the fragment the larger the veining will be after processing through a press roller or a pair of press rollers.

The shape of each fragment is typically preferred to be random, because if the fragments are too uniform the resultant veining after processing through a press roller will be too mechanical or artificial looking.

At step 808 of FIG. 9, the plurality of fragments are deposited somewhat evenly onto a supporting structure, such as onto a conveyor belt, so as to avoid regions in which there is substantially more composite material than others. In doing so, in some examples, fragments having particular/desired sizes (or desired ranges of sizes) are selected (from the available fragments form from step 806) and deposited onto the conveyor belt (e.g., randomly, at specific locations on the conveyor belt, etc.). The fragments may be distributed on the conveyor belt so that at least some of the side walls of some of the fragments (e.g., walls of the fragments not contacting the conveyor belt, etc.) are exposed (and/or are free from engagement with other fragments or with side walls of other fragments). In this way, the side walls of the fragments are exposed for application of colorant (as described herein).

In some examples, in connection with depositing the fragments on the supporting structure, at least one of the fragments (e.g., fragments having one or more desired sizes, etc.) are distributed on the surface of the conveyor at specific, predefined locations (e.g., based on a predefined mapping of fragment locations in order to achieve a particular vein design, etc.) (e.g., using a location depositing control device as described herein, or manually, etc.). This can help ensure a proper spacing of different sized and/or shaped fragments on the conveyor so that desired veined effects (having particular locations, lengths, etc.) are created in the resulting slab (when the fragments are pressed, flattened and stretched by the press roller(s), etc.).

At step 810 of FIG. 9, colorant is applied to the side walls of the plurality of fragments. In some examples, the colorant is applied to the side walls of the fragments so that colorant is applied to substantially an entire height of the side walls of the fragments (e.g., via one or more of the devices described herein, including the spray device 6, the digital printing device described herein, etc.).

In some examples of the method 800, in connection with applying colorant to the side walls of the plurality of fragments, the method 800 may additionally include forming a channel in the plurality of fragments (as generally described herein) and applying the colorant to the side walls of the plurality of fragments at the channel (e.g., to the side walls of the fragments forming the channel, etc.). In such examples, the channel may be formed by moving at least some of the plurality of fragments without substantially breaking or deforming the fragments (e.g., without changing or altering a shape of the original random shaped fragments, etc.). In addition, in such examples, the channel may have a non-linear pattern and/or may have a random edge profile that is not smooth (or is not cut). Further, in some examples, additional colorant may then be applied to the fragments (e.g., at the channel again, away from the channel, etc.), after the first step of applying colorant to the fragments at the channel (such that the additional colorant is added as part of a second step of applying colorant (e.g., via a digital printing device, etc.)).

In addition, in some examples of the method 800, in connection with applying colorant to the side walls of the plurality of fragments, the method 800 may include applying colorant to the side walls of the plurality of fragments as generally described above (as a first step of applying colorant to the fragments) (e.g., via a digital printing device, via other spray nozzles, etc.). The method 800 may then include forming a channel in the plurality of fragments (as generally described herein), after the first step of applying colorant. And then, in some example embodiments, additional colorant may be applied to the side walls of the plurality of fragments at the channel (e.g., to the side walls of the fragments forming the channel, etc.), as a second step of applying colorant to the fragments (e.g., via spray nozzles, etc.).

Further, in some examples of the method 800, in which a digital printing device is used to apply (e.g., print, etc.) colorant to the side walls of the fragments (at step 810), an image of natural stone may be provided (e.g., uploaded, scanned, etc.) to the digital printing device (e.g., directly or via a computing device in communication with the digital printing device, etc.). The image may include a desired vein pattern to be incorporated into an engineered slab being formed via the method 800. In doing so, as described herein, the image may be processed to account for the stretching of the fragments by the press roller at step 812. In particular, the image may be compressed, for instance, along one axis which aligns with the axis in which the press roller stretches the fragments on the supporting structure. The compressed image, then, is mapped to the supporting structure (e.g., in X and Y coordinates, etc.) and printed onto the fragments on the supporting structure. And, the digital printing device operates to deposit (e.g., print, etc.) different colored colorants in liquid, powder or particle formats onto the fragments matching the vein patterns in the compressed image (as mapped to the fragments on the supporting structure).

Figure 16:
FIG. 16 shows an image of a natural stone slab that may be used as input for applying colorant to fragments of material used to form an engineered slab herein.
Figure 17:
FIG. 17 shows the image of the natural stone slab in FIG. 16 distorted (e.g., compressed, etc.), as described herein, to account for stretching of the fragments and colorant added thereto during compression of the fragments to form an uncured slab.

In connection therewith, FIG. 16 illustrates an example image that may be provided to the digital printing device of a desired natural stone pattern, and FIG. 17 illustrates the example image as processed. As shown, the processed image of FIG. 17 is compressed, for instance, in a horizontal direction (as viewed in FIG. 17) (e.g., along an axis which aligns with the axis in which the press roller stretches the fragments on the supporting structure, etc.).

At step 812 of FIG. 9, the random shaped fragments (and the colorant applied thereto) are compressed (e.g., as part of a second compressing step, etc.) and stretched/deformed by a press roller, pair of press rollers, or other device (as generally described herein). In doing so, in some examples, the fragments are formed into a continuous, compressed slab of material (e.g., by the press roller, pair of press rollers, or other device) on a conveyor belt that is not cut or not yet cut (and that is not yet cured).

In some examples, the continuous, compressed slab of material extends (along the conveyor belt, by the conveyor belt, on the conveyor belt, etc.) from the press roller, or a pair of press rollers, or other compressing device to a cutting device (e.g., located along the conveyor belt, etc.). At step 814 of FIG. 9, the continuous, compressed slab of material (as uncured or not yet cured) is cut by the cutting device (e.g., while still on the conveyor belt, etc.) to form desired lengths of compressed slabs (from the continuous, compressed slab of material) (and again, before the compressed slabs are cured and before any curing step is performed in the method 800).

At step 816 of FIG. 9, the desired lengths of compressed slabs, as cut, are processed and then cured to form cured slabs (cured engineered stone slabs). For instance, the cut slabs may be conveyed (e.g., via the conveyor belt or a different conveyor belt, etc.), from the conveyor belt on which the material is cut, to be vibrated and vacuum compacted and then to a curing oven for curing. The cured slabs may then be further processed as desired (e.g., cooled a cooling tower, etc.), trimmed to size, ground down to desired thickness, polished, etc.).

In at least one embodiment of the present disclosure, the condensed composite material/mixture specified in step 806 is formed.

The advantage of processing and depositing the plurality of fragments in this manner is that as additional layers of composite material are added in certain areas such as by spraying colorant onto the previous layers in predefined areas, the colorant will be applied also to the side walls of the random shaped fragments. These side walls are typically random shapes (e.g., zig-zag shapes, jagged shapes, etc.) as opposed to smooth, flat surfaces. This leads to a greater surface area in which the colorant layer is applied compared to a slightly compressed composite material in which the surface of the slightly compressed composite material is substantially flat, and therefore colorant is only applied substantially to the top surface (see, also, FIGS. 16-18 and corresponding discussion thereof below).

The number of random shaped fragments distributed onto the belt may vary, and the height of the random shaped fragments distributed onto the belt may be greater or much greater than the specified distance between the press roller and the belt or between a pair of press rollers in an alternative method. Therefore, when the random shaped fragments are fed through the press roller, there will be an accumulation of material at the front of the press roller. The height of the accumulation may be controlled by a number of factors including belt speed, press roller rotational speed, height or average height of the random shaped fragments, and distance between the press roller and the belt, or distance between a pair of rollers. In this way, the accumulated fragments (and colorant coating the fragments) generally build up in front of the press roller(s) so that a sufficient amount of the particles are available to be compressed and stretched by the press roller to form the desired veined effect in the resulting slab. The height of this accumulation (which can be changed by adjusting the speed of the conveyor and the height of the first press roller) can in turn be used to vary, for example, the length of the veined effect formed in the slab. In turn, the random shaped fragments of composite material (and colorant applied thereto) will be squeezed by the roller or rollers and deformed into one piece to form a flat, uncured slab once it passes through the roller or rollers. The larger random shaped fragments (and colorant applied thereto) also have a tendency to be squeezed away from the press roller and also towards smaller random shaped fragments, therefore shifting the vein pattern created by the colorant deposited on the side walls of the random shaped fragment.

In one or more embodiments of the present disclosure, there are film dispensers and removers attached to the press rollers to cover each of the press rollers as it presses the fragments (and colorant). The composite material is a damp particulate mixture which may stick to the press roller. To prevent this, a protective film may be applied by a film dispenser press roller upstream from the location the press roller comes into contact with the random fragments. Downstream from the press roller a film remover may remove or wind up the used film. A PET protective film may also be used in between fragments and the conveyor belt to prevent the damp fragments from sticking on to the conveyor belt.

For example, the height of the distributed random shaped fragments piled up (or accumulated) in front of the press roller may be about 100 mm from the belt, and the gap between the press roller and belt may be about 30 mm (e.g., the height of the piled up fragments may be between about two times and about four times (or more or less) the size of the gap between the press roller and the belt, or about four times or less, etc.). The random shaped fragments will be pressed and squeezed by the roller or rollers to deform into a flat slab with a height of a little over about 30 mm after exiting the press roller. The composite material has some elasticity so the final height may be slightly larger than the press roller height. Since the colorant was also applied to the side walls of the random shaped fragments (prior to the fragments moving through the press roller), the subsequent colorant veining will appear not only on the top surface of the slab but also throughout the thickness of the slab which results in a desirable through bodied appearance of natural random vein patterns.

In one or more embodiments of the present disclosure, multiple sets of press rollers may be used sequentially in order to gradually compress the material over a plurality of press rollers or pair of press rollers. As an example, the height of the random shaped fragments piled up in front of the press roller may be about 100 mm from the belt, the gap between first press roller and the belt or pair of press rollers may be 30 mm, and the gap between the second press roller or pair of press rollers may be about 28 mm.

In one or more embodiments of the present disclosure, the random shaped fragments may be deposited onto a stationary supporting structure, and the press roller or pair of press rollers may be designed to move along a track back and forth in order to compress the random shaped fragments, similar to a rolling pin across dough. The height of the press roller or pair of press rollers may be adjustable.

Notably while covering more surface area of any particular random shaped fragment is desirable, coating more of the side walls, or vertical surfaces, of a random shaped fragment is also important depending on the desired final design aesthetic. The press roller or rollers has a tendency to substantially stretch the composite material in the horizontal direction, but very little stretching in the vertical direction. Therefore, if colorant is only on the top surface of the composite material, or of the composite material is slightly pressed with a flat top surface, the colorant will substantially remain on the top surface after passing through the press roller. For example, if a random shaped fragment has significantly more horizontal surface area such as a flat disc, all the colorant on the top surface of the disc will remain substantially on top after passing through the press roller. This will lead to the colorant appearing on the horizontal top surface of the slab as opposed to having a through bodied appearance in the vertical direction. If however the random shaped fragment is a cylinder with more height than width and colorant is applied throughout the height of the side walls (e.g., applied to the entire height of the side walls or substantially the entire height of the side walls, etc.), the colorant on the randomly shaped vertical surface will elongate in the horizontal direction after passing through the press roller and deformed. The subsequent appearance of the slab will not only have visible colorant veining on the horizontal surface, but also will have random veining through the body of the slab in the vertical direction (e.g., through the entire thickness of the body of the slab or through substantially the entire thickness of the body of the slab, etc.).

Figure 10:
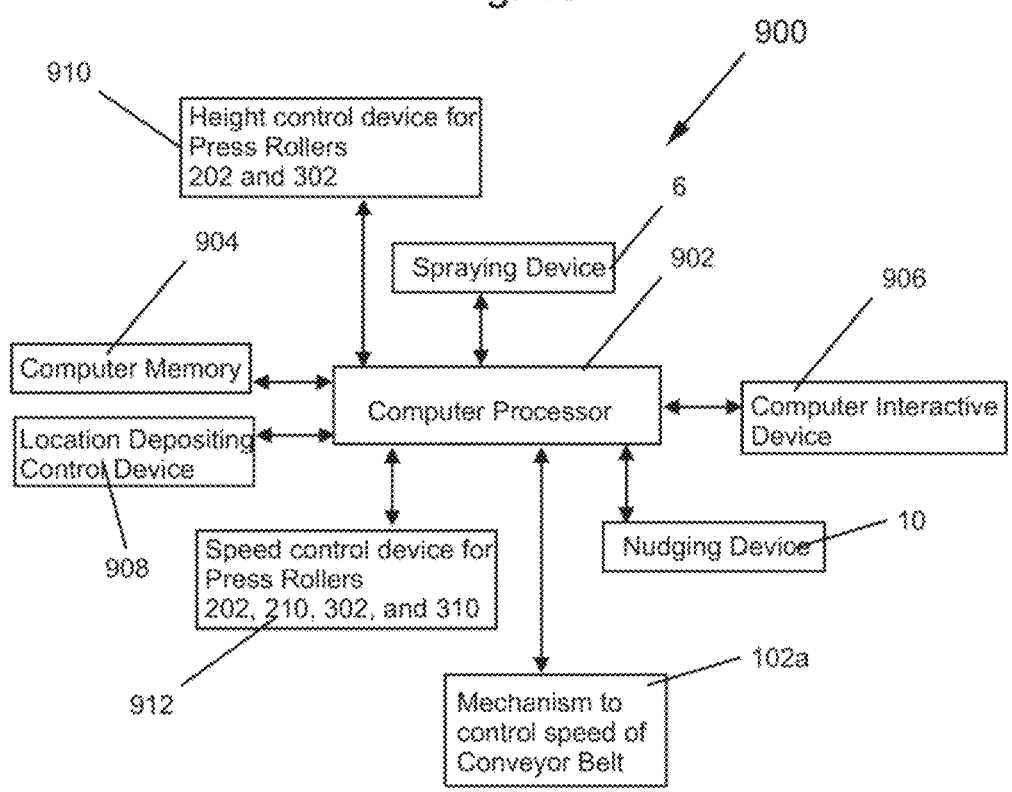
FIG. 10 shows a simplified block diagram of components for use with an embodiment of the present disclosure.

FIG. 10 shows a simplified block diagram 900 of components for use with an embodiment of the present disclosure. The block diagram 900 shows computer processor 902, computer memory 904, and computer interactive device 906. The computer interactive device 906 may include, for example, a computer touchscreen, computer mouse, and/or computer keyboard. The block diagram 900 also refers to nudging device 10 previously shown in FIGS. 1 and 2.

As shown in FIG. 10, the computer processor 902 communicates with, at least, spraying device 6, nudging device 10, location depositing control device 908, speed control device 912 (or devices) for press rollers 202 and 302, height control device 910 for press rollers 202 and 302, and a mechanism 102a for controlling the speed of conveyor belt 102.

One embodiment of the present disclosure may include the nudging device 10 controlled by CNC, such as by using computer processor 902 as programmed by computer software stored in computer memory 904, in which a narrow head at end 10a of the nudging device 10 is used so that the device 10 does not carve (or cut) through the random shaped fragments, breaking or compressing them. Rather this device 10 is configured to slightly push or move the plurality of random shaped fragments aside and retain their random shape (e.g., without changing or without substantially changing a shape of the fragments that are pushed or moved, etc.).

The device 10 has an end 10a and an opposite end 10b. The device 10 has a head 10c and a tail 10d.

The tail 10d is elongated, and has a width W1, a length L1, and a height H1 as shown in FIG. 2. The width W1 is preferably the same over the entire length L1. The dimensions W1, L1, and H1 may be 2 mm, 90 mm, and 80 mm, respectively, so that the tail 10d is elongated.

The elongated narrow tail 10d is preferably made from a flat rigid plate and may be attached to the head 10c and be configured to oscillate back and forth like a pendulum by rotating about axis 16 to further push the random shaped fragments aside, but not push so hard as to deform or break the random shaped fragments. The distance of oscillation may vary based on design requirements such as the desired width of the channel to be formed, and the force of oscillation may vary based on the specific formula used to form the random shaped fragments. The oscillation of the nudging device 10 forms a channel within the plurality of fragments, which has a somewhat random edge profile due to the random shape of the plurality of fragments pushed aside which are not broken or deformed and/or are not substantially broken or deformed (e.g., the shape of the fragments is not changed is or not substantially changed as the fragments are pushed or moved, the fragments maintain their general starting shape, etc.). This allows for a more realistic veining effect once the channel walls are coated with colorant and elongated through a press roller, or a pair of press rollers. This contrasts with the smooth channel walls formed, for example using a V-shaped cutting wheel type device, or any other form of known cutting device that travels through composite material.

Figure 18:
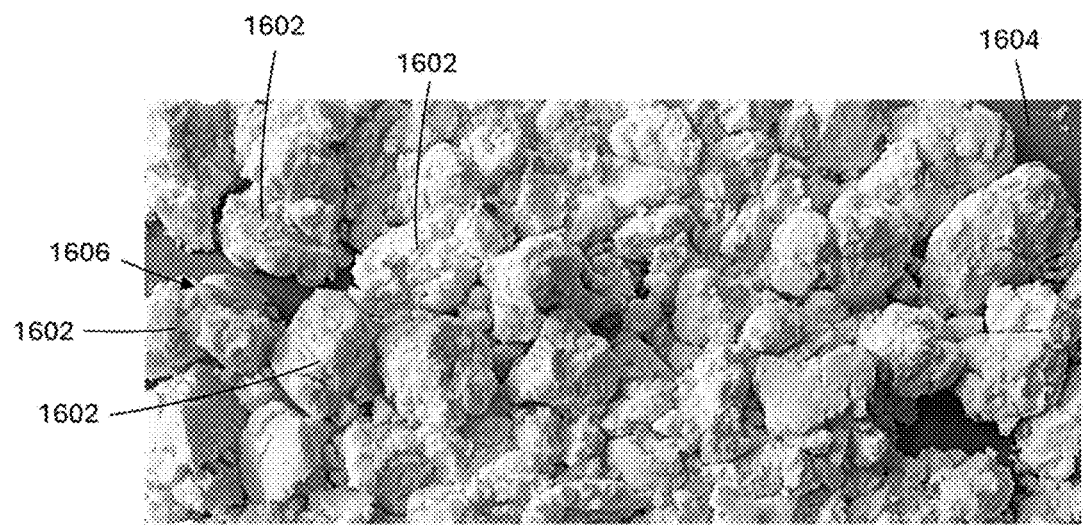
FIG. 18 shows an image of random shaped fragments deposited on a supporting structure and with a channel formed therein having jagged and not smooth side walls, in accordance with the present disclosure.
Figure 19:
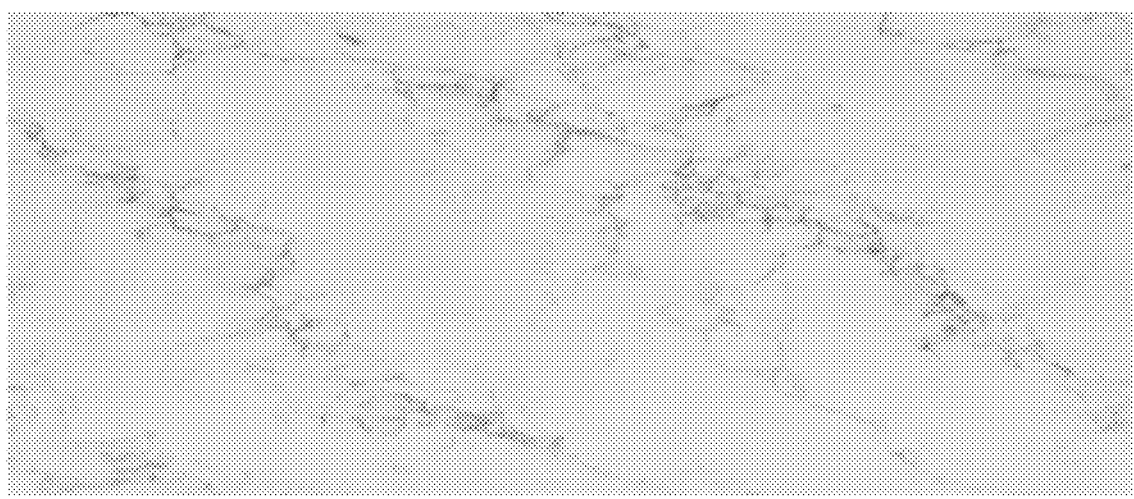
FIG. 19 shows an image of a finished, cured slab with veins formed therein through the unique formation of channels as described herein and with reference to FIG. 18.

In connection with the above, FIG. 18, for example, illustrates multiple random shaped fragments 1602 deposited on a supporting structure 1604. A channel 1606 is formed in the fragments 1602 in the manner described above, whereby some of the fragments 1602 are moved or pushed aside (e.g., away from other fragments in order to form the channel 1606 therebetween, etc.), without substantially breaking or deforming or changing the shape of the moved fragments 1602. As such, the resulting channel 1606 (e.g., elongate channel, etc.) forms a non-linear pattern and has a random edge profile in which side walls of the channel are not smooth (e.g., are jagged, etc.). The side walls of the fragments forming the channels are not merged or meshed together (because the fragments are simply moved aside without disturbing their shape), and remain exposed and free of contact from other fragments, etc. As such, when colorant is applied to the fragments at the channel, additional surface area of side walls is available to receive the colorant. And, in turn, as shown in FIG. 19, the resulting veins formed in the slab may generally be zig zag in shape (based on the random shaped fragments being moved/pushed to form the channels/veins (which in turn have the random edge profile that is not smooth, and more resembles a crack vein in natural stone)).

Figure 20:
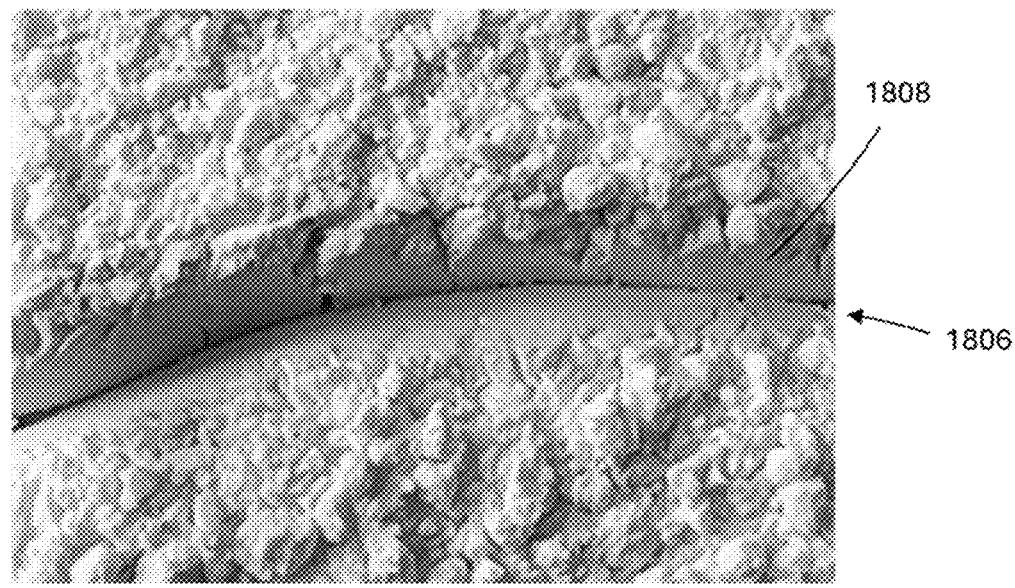
FIG. 20 shows an image of a conventional damp material used to form a slab and having a channel formed therein using cutting techniques known in the prior art, such that the channel has smooth side walls.
Figure 21:
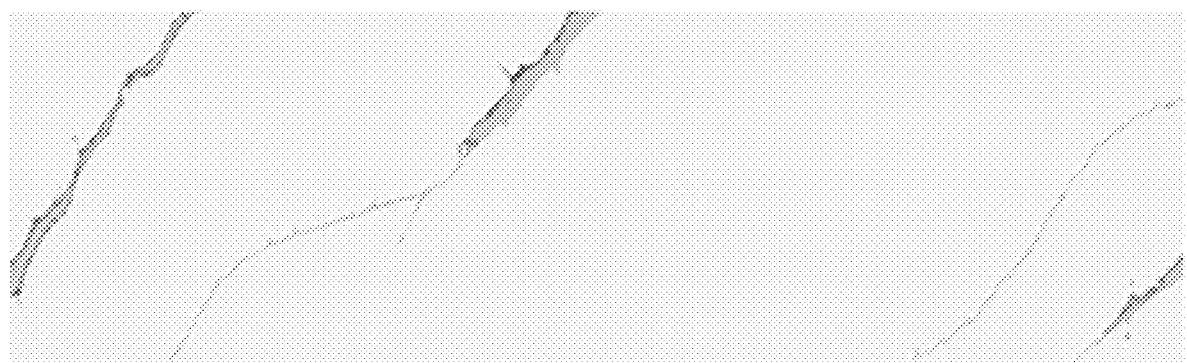
FIG. 21 shows an image of a finished, cured slab with veins formed therein through formation of channels using cutting techniques known in the prior art (as shown in FIG. 20)

In contrast, in conventional slab formation operations, channels are cut into a soft, damp material so that side walls of the channel are smooth (and any fragments of material within the material are deformed so as to form the smooth side walls). An example of a channel 1806 formed by such a conventional cutting operation, in the conventional damp material 1808 used to form the slab, is shown in FIG. 20. As can be seen, the conventional channel 1806 has smooth side walls. And, in turn, as shown in FIG. 21, the resulting veins formed in the slab are relatively smooth (based on the conventional cutting operation use to form the smooth walls of the channels/veins).

After the channels are formed, additional layers of composite material or colorant may be applied to predefined areas. One example of such a method includes use of a spray gun or device 6 shown in FIG. 2 controlled by CNC (and/or by computer processor 902) to deposit colorant or colorants on top of certain regions of the plurality of random shaped fragments. In this manner the side walls of the plurality of randomly shaped fragments that have been moved by the nudging device 10 have colorant deposited onto them. Due to the proximity of each random shaped fragment along the path in which colorant is deposited, the colorant on each random shaped fragment will stretch into the adjoining random shaped fragment, simulating the appearance of a continuous long vein in the slab after passing through a press roller, such a press roller 202 or 302 of FIG. 4. Since each random shaped fragment is squeezed and deformed differently, the continuous long vein will have a somewhat random zig zag pattern, better simulating the random veining found in natural stone.

The size of the random shaped fragments is important in controlling the amount of volume that has colorant applied to it. As random shaped fragment size gets smaller, there is less volume that has the original color of the composite material, until the particle size becomes so small as to change the color of the entirety of the composite material to the color of the colorant. After passing through the press roller, such as either press roller 202 or 302 of FIG. 4, the smaller fragments would lead to an undesirable monochrome or short veined appearance.

Another method to ensure that a significant amount of vertical surface area is coated by colorant is to deposit random shaped fragments that are significantly larger than others on a conveyor belt, such as conveyor belt 102 or other supporting structure. The location on the conveyor belt 102 or other supporting structure in which each large random shaped fragment is deposited may be controlled for example by location depositing control device 908, shown in FIG. 10, as controlled by computer processor 902. For instance, the location(s) may be determined based on desired veins to be achieved, such that the large random shaped fragments are placed at specific locations on the conveyor relative to the press rollers 200 or 300, etc. This will ensure that a significant portion of the large random shaped fragment's side walls are coated in colorant, and if enough of these large random shaped fragments are close together, after passing through the press roller, such as rollers 200 and 300, the random shaped fragments will connect and create a long veined effect.

The larger the random shaped fragment sizes or the more random shaped fragments that are distributed onto the belt 102 of FIG. 1, the more deformed and stretched the composite material will become after passing through the press roller or rollers 202 and 302. This will result in elongated veining that is somewhat controllably stretched depending on how much composite material is piled up in front of the press roller 202 or 302. If not enough composite material is piled up in front of the press roller 202 and/or 302 shown in FIG. 4, the amount the composite material is stretched will be minimal. To an extreme, if there is not enough material the fragments will not be compressed and will exit the press roller as fragments and not a singular piece of a flat slab. If too much material is piled up in front of the press roller 202 and/or 302, the composite material will stretch too much. There is a specific amount of stretching desired depending on what final design aesthetic is required. In addition, the speed of the belt 102 may be increased by the computer processor 902 in order to cause more random shaped fragments to pile up in front of the press roller 202 or 302 or slowed down to cause less random shaped fragments to pile up in front of the press roller 202 or 302.

The rotational speed of the press roller or pair of press rollers 202 and 302 (controlled by computer processor 902 through device 912) as well as the height between the belt 102 and the press roller or pair of press rollers 202 and 302 (controlled by computer processor 902 through device 910) will also influence the degree of deformation of the random shaped fragments of composite material.

In one or more embodiments of the current disclosure, the colorant is deposited, such as by spraying device 6, along a predefined pattern or track that connects a plurality of fragments by depositing colorant not only on the surface but also along the height of the side walls of the fragments. For instance, particular fragments may be identified on the belt 102 (e.g., by the processor 902 via an imaging device, etc.), and the spraying device 6 may be operated to specifically spray the identified fragments or to spray in a specific pattern that connects the identified fragments, etc.). After depositing the colorant and passing through the press roller or rollers 202 and 302, the subsequent elongated through bodied veins will appear as a continuous vein on the surface of the processed slab.

Fragment size is typically controlled depending on a variety of factors including the desired final design aesthetic and the method in which additional layers of composite material or colorant is to be deposited onto the surface area or side walls of the fragments. After applying the colorant this will form a desired pattern on the individual or a plurality of the fragments. This is used in combination with the press roller or rollers 202 and 302 to obtain the desired result.

There are other embodiments that utilize apparatuses and devices to push fragments aside, other than the aforementioned nudging device 10, to expose more surface area or side walls of the fragments while still maintaining the fragment shape and not breaking or deforming the fragments.

Variables may be adjusted and stored in computer memory 904 to control, through computer software executed by computer processor 902, how much the composite material deforms and stretches after passing through the press roller or rollers 202 and 302. The distance between the press roller and the belt, the height and amount of fragments of composite material, and the speed of the belt 102 feeding the press roller or rollers 202 and 302 are all controlled by computer processor 902, in at least one embodiment.

In at least one embodiment, the computer processor 902 may process an image of natural stone or a compressed or distorted, etc. image of natural stone in computer memory 904 and communicate with spraying device 6 to deposit colorant on at least some of the side walls of at least some of the plurality fragments according to the image of natural stone or the compressed or distorted, etc. image of natural stone.

Figure 11:
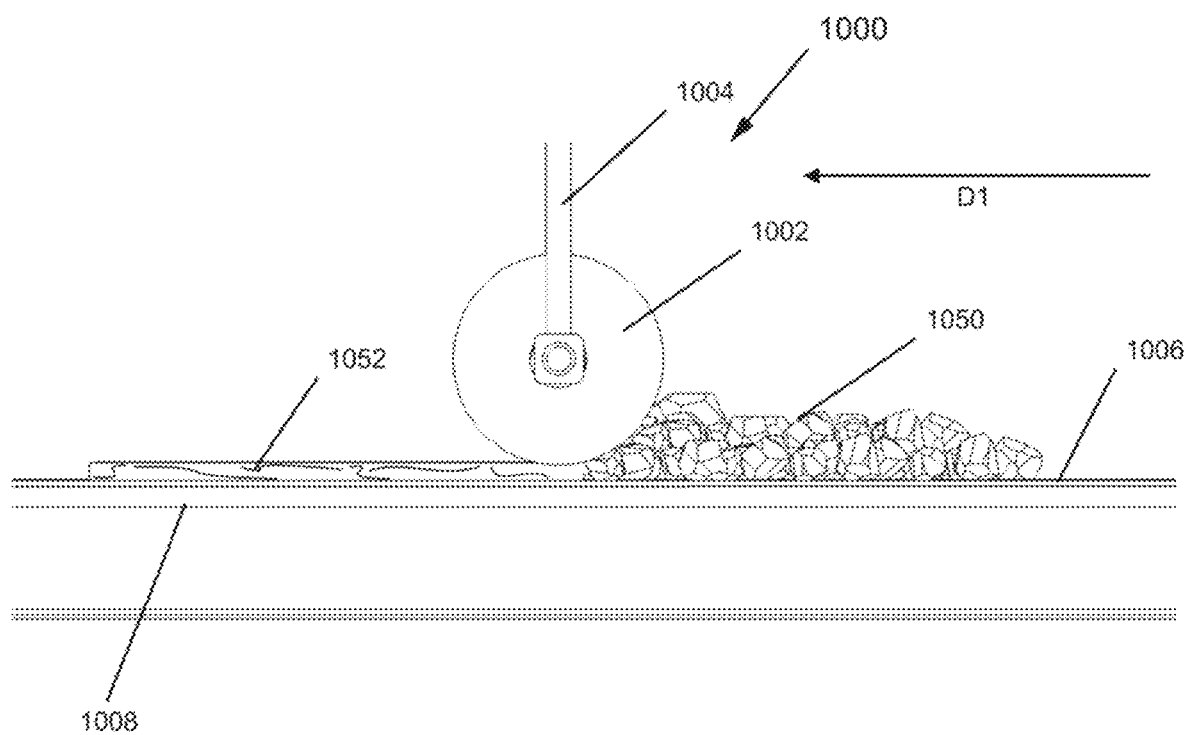
FIG. 11 shows a side view of a press roller in an embodiment of the present disclosure during operation in which fragments of composite material are being deformed, stretched and compressed into one piece to form a flat slab by the press roller.

FIG. 11 shows a simplified diagram 1000 of a side view of a press roller 1002 rotatably mounted to a member 1004 in an embodiment of the present disclosure during operation in which at least some of the plurality of fragments 1050 of a composite material are being compressed by the press roller 1002, and the remaining fragments of 1050 are going to be compressed as a conveyor belt 1006 moves in the direction D1 to move the fragments 1050 into the towards the roller 1002. The component 1052 represents fragments that have been compressed by the roller 1002 into a single piece with through bodied veins throughout the compressed, uncured slab (e.g., extending through a thickness of the slab or substantially through a thickness of the slab, etc.). FIG. 11 also shows steel plate 1008 on which the conveyor belt 1006 moves.

Figure 12:
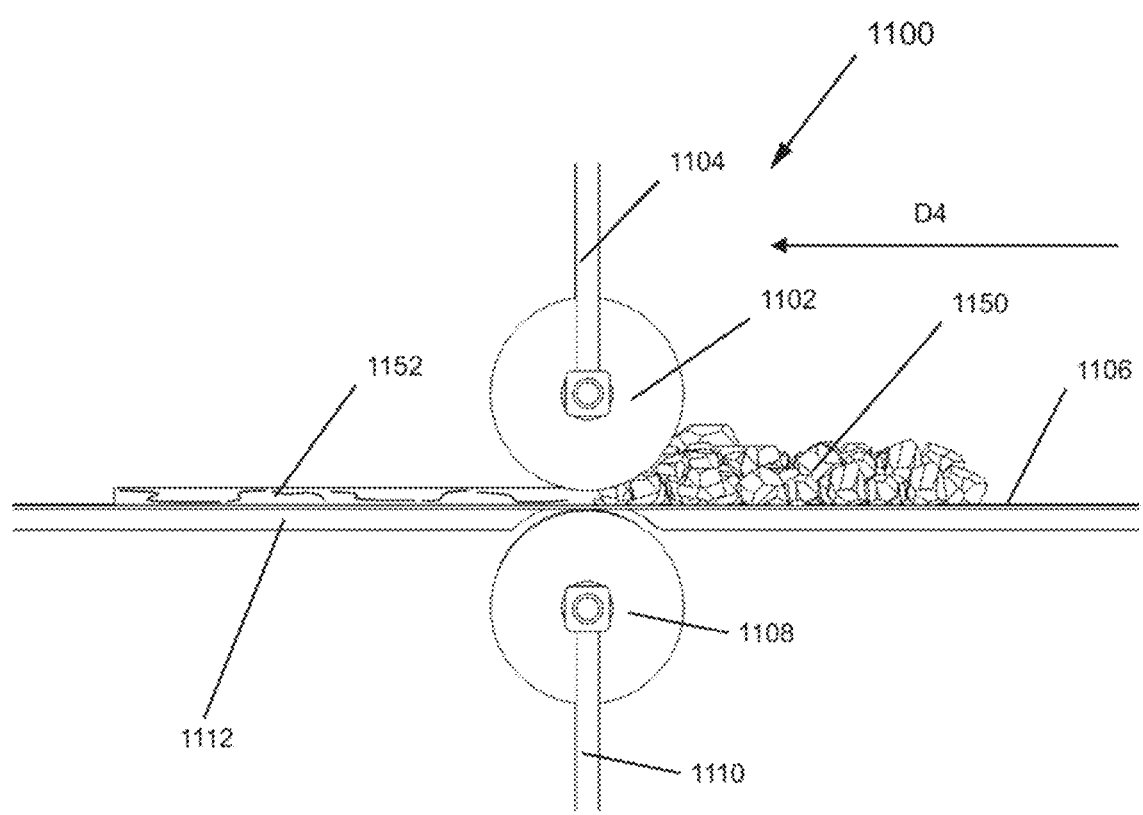
FIG. 12 shows a side view of a pair of press rollers for use in accordance with an embodiment of the present disclosure.

FIG. 12 shows a simplified diagram 1100 of a side view of a press roller 1102 rotatably mounted to a member 1104 in an embodiment of the present disclosure during operation in which at least some of the plurality of fragments 1150 of a composite material are being compressed by the press roller 1102, and a press roller 1108, and the remaining fragments of 1150 are going to be compressed as a conveyor belt 1106 moves in the direction D4 to move the fragments 1150 towards the gap between rollers 1102 and 1108. The component 1152 represents fragments that have been compressed by a combination of the rollers 1102 and 1108 into a single piece with through bodied veins throughout the compressed, uncured slab (e.g., extending through a thickness of the slab or substantially through a thickness of the slab, etc.). FIG. 12 also shows steel plate 1112 on which the conveyor belt 1106 moves.

In the FIG. 12 embodiment, the press roller 1108 underneath the conveyor belt 1106 also rotates in order to assist in making sure there is not a braking effect due to the friction between the top press roller 1102 and the conveyor belt 1106.

Figure 13:
FIG. 13 shows a slab produced using techniques known in the prior art that include coating fragments with colorant which forms short veins within each individual fragment but do not connect to shot veins formed by other fragments, as opposed to in the present disclosure which gives the appearance of a long, connected vein that travels a significant distance throughout the slab.

FIG. 13 shows a slab produced using techniques known in the prior art that include coating fragments with colorant which forms short veins within each individual fragment but do not connect to shot veins formed by other fragments, as opposed to in the present disclosure which gives the appearance of a long, connected vein that travels a significant distance throughout the slab.

A significant advantage of one or more embodiments of the present disclosure is the ability to have a continuous run of material as opposed to forming slabs one at a time. In addition to cost savings it may be aesthetically advantageous to produce lengths of slabs longer than a standard slab length (wherein the standard slab length is typically about 3 to 3.6 meters). This is because if you were to produce a single slab, the degree of stretching present at the front or back of the slab may be significantly different than in the middle since there is not enough material accumulated in front of the press roller at these points. If for example a length of ten uncured slabs were produced continuously (e.g., as a continuous length of material along belt 102), the material at the front and back of the length of slabs may be discarded and the remainder cut into 3.2 meter length increments for further processing (e.g., for curing, etc.).

Another significant advantage of the one or more embodiments of the present disclosure is the ability to save material cost. It is very difficult to distribute material evenly throughout a large enough format such as the area of a slab, which may be about 1.5 to 2.2 meters×3 to 3.6 meters with an example thickness of 60 mm. The vibration and compaction step may level local regions out, however if one end of the slab has more material than the other end, it is difficult to level. In production the slabs are generally produced thicker than would otherwise be necessary in order to accommodate this unevenness, and then the slab is ground down to the correct size in a later step in the process. For example, if a final product thickness of 30 mm is desired, a slab thickness of 36 mm may be produced and later grinded and polished to 30 mm, wasting the additional 6 mm of material. By using a press roller or similar device to squeeze any excess material flat, it is possible to produce slabs that are much more consistent and flat compared to the prior art, allowing for the production of slabs thinner than 36 mm while still maintaining a final product thickness of 30 mm.

Figure 14:
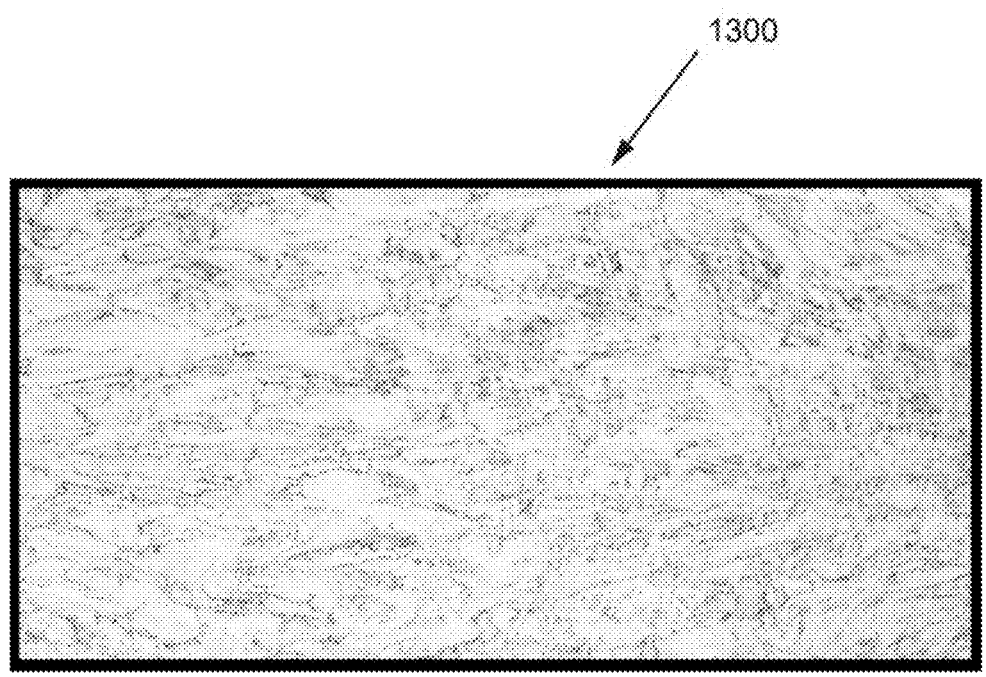
FIG. 14 shows an image of a slab produced in a single batch, in accordance with an embodiment of the present disclosure, as opposed to continuously, wherein the degree of stretching on the left hand side is very different than the right hand side.

FIG. 14 shows an image 1300 of a slab produced in a single batch, in accordance with an embodiment of the present disclosure, as opposed to continuously, wherein the degree of stretching on the left hand side is very different than the right hand side.

Figure 15:
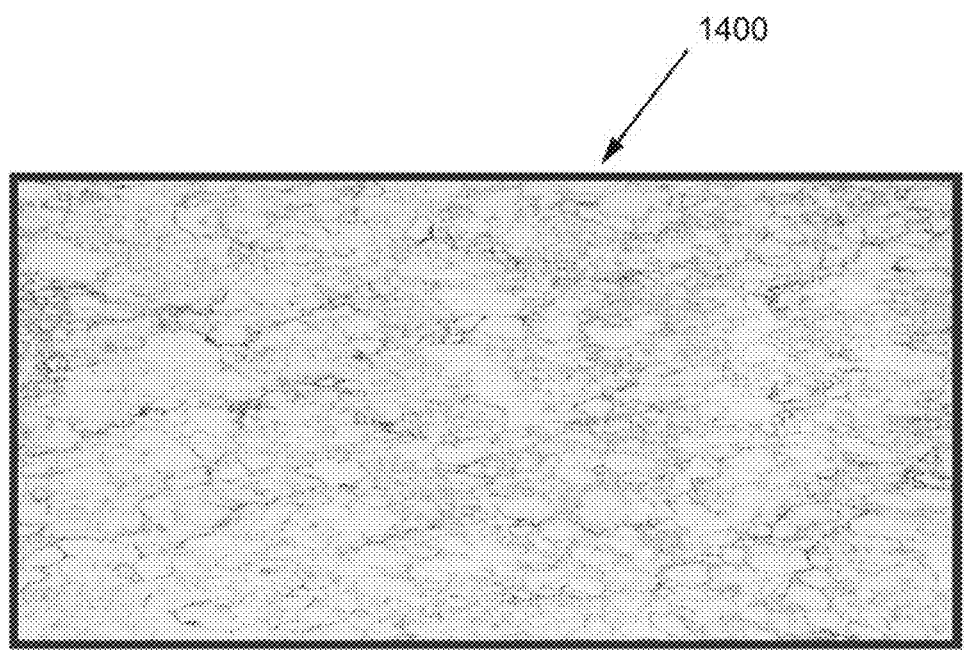
FIG. 15 shows an image of a slab produced in a continuous run, in accordance with an embodiment of the present disclosure, wherein the degree of stretching is substantially uniform throughout the length of the slab.

FIG. 15 shows an image of a slab 1400 produced in a continuous run, in accordance with an embodiment of the present disclosure, wherein the degree of stretching is substantially uniform throughout the length of the slab.

Figure 22:
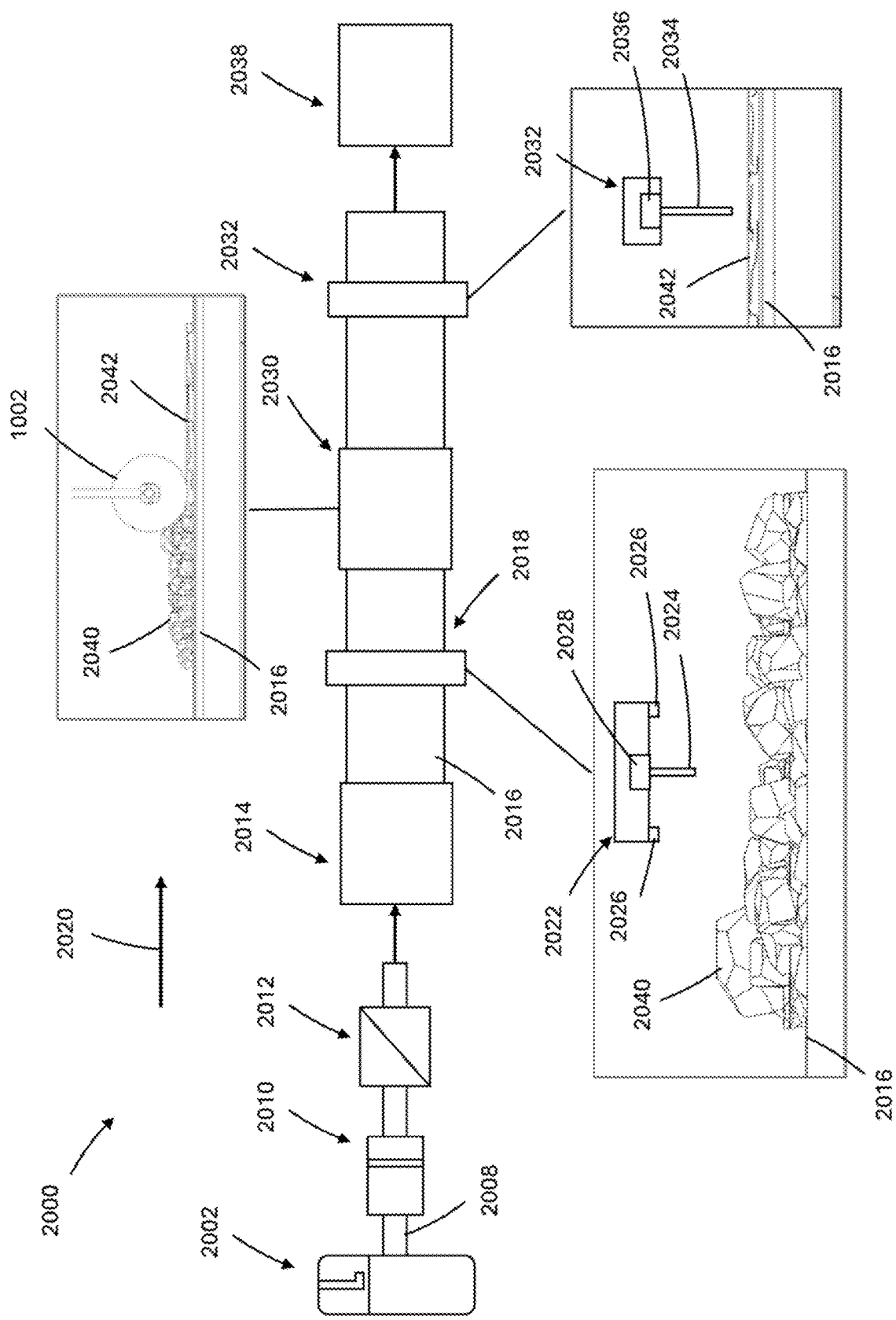
FIG. 22 shows an example system of the present disclosure, configured for use in producing engineered stone slabs.

FIG. 22 shows an example system 2000 of the present disclosure, configured for use in producing engineered stone slabs as described herein (e.g., generally consistent with method 800 such that the method 800 may be effected by the system 2000, etc.).

As shown, the example system 2000 includes a mixing unit 2002 configured to combine (or mix) aggregate minerals such as quartz or glass grits and powder (e.g., raw aggregate materials, etc.) with resin, colorant and/or other additives to obtain a damp composite material (or damp composite mixture of the aggregate minerals) (e.g., generally consistent with step 802 of method 800, as described above; etc.). Once mixed, the composite material (or mixture) is transported, by a conveyor 2008 (e.g., a conveyor belt or other supporting surface, etc.), to a first compressing unit 2010. The first compressing unit 2010 is configured to compress the composite material, on the conveyor 2008 in this example, into a condensed composite mixture (e.g., as part of a first compressing step, etc.) (e.g., generally consistent with step 804 of method 800, as described above; etc.). The conveyor 2008 is configured to then transport the compressed composite material to a fragmentation unit 2012, which is configured to break the compressed composite material into a plurality of fragments. As described, such breaking up of the compressed composite mixture/material may be done by a stirring device, by dropping the compressed composite mixture/material onto a grid or sieve, or by other means available to generally break compressed material into fragments (e.g., generally consistent with step 806 of method 800, as described above; etc.).

Once formed, the fragments (formed at the fragmentation unit 2012) are delivered, by the conveyor 2008, to a deposit unit 2014 configured to deposit the fragments onto a supporting structure 2016 (e.g., a conveyor belt, etc.), as generally described at step 808 of method 800. In doing so, the fragments 2040 may be deposited generally evenly across the supporting structure 2016 (e.g., across a width of the supporting structure 2016, etc.), so as to avoid regions in which there is substantially more fragments 2040 than others. In at least one embodiment, the conveyor 2008 and supporting structure 2016 may be the same, or supporting structure 2016 may be placed on top of conveyor 2008 prior to compressing unit 2010. In turn, the supporting structure 2016 Is configured to transport the fragments 2040 to a color application unit 2018. The color application unit 2018 is configured to apply colorant to the fragments 2040 on the supporting structure 2016, and in particular, to at least some of the side walls of at least some of the fragments 2040, as the fragments 2040 are moved by the supporting structure 2016 through the system 2000 (in the direction of arrow 2020 in FIG. 22) (e.g., as generally described in connection with step 810 of method 800, etc.).

In the illustrated embodiment, the color application unit 2018 includes a digital printing device 2022 (as generally described herein), configured to apply (e.g., print, etc.) colorant to the fragments 2040 as the fragments 2040 are moved to and through the color application unit 2018 (via the supporting structure 2016). In connection therewith, the digital printing device 2022 includes a nozzle 2024 configured to move in the X, Y, and Z directions relative to the supporting structure 2016 (and the fragments 2040 on the supporting structure 2016). For instance, the nozzle 2024 operates to move in the X and Y directions (e.g., via a gantry and corresponding supports 2026, etc.) to deposit (e.g., print, etc.) desired colorant (e.g., desired colors, amounts of colors, etc.) to the fragments 2040 on the supporting structure 2016 at particular X, Y locations over the supporting structure 2016. In addition, the nozzle 2024 also operates (via an actuator 2028) to adjust a vertical distance (in the Z direction) between the nozzle 2024 and the fragments 2040 so that the nozzle 2024 may be a desired distance away from the fragments 2040 on the supporting structure 2016. While the digital printing device 2022 is described above as including one nozzle 2024, it should be appreciated that the digital printing device 2022 may include multiple nozzles in other example embodiments (as generally described herein), where the nozzles operate in a similar manner to the nozzle 2024 (or not).

In addition, in some examples of the system 2000, the color application unit 2018 may also include an apparatus (e.g., device 10, etc.) configured to form a channel in the fragments 2040 while the fragments 2040 are on the supporting structure 2016 (e.g., before colorant is added to the fragments 2040, etc.) (as generally described herein). Then, once the channel is formed in the fragments 2040, the color application unit 2018 (e.g., the digital printing device 2022, etc.) operates to apply the colorant to at least part of the side walls of at least some of the fragments 2040 at the channel (e.g., to the side walls of the fragments 2040 forming the channel, etc.).

Once colorant is added to the fragments 2040 on the supporting structure 2016, the supporting structure 2016 is configured to move the fragments 2040 (and colorant) to a second compressing unit 2030. The second compressing unit 2030 is configured to compress and stretch the fragments 2040 (as generally described herein, for example, with reference to step 812 of method 800). In doing so, the fragments 2040 are formed into a continuous, compressed (and uncured) slab 2042 of material on the supporting structure 2016. In the illustrated embodiment, the compressing unit 2030 includes a press roller (e.g., press roller 1002, etc.) configured to compress the fragments 2040 into the compressed slab 2042 of material (with through bodied veins throughout the slab 2042 (e.g., as discussed with reference to FIG. 11 herein, etc.)).

Next in the system 2000, the supporting structure 2016 is configured to transport the continuous, compressed slab 2042 of material from the compressing unit 2030 to a cutting unit 2032. The cutting unit 2032 is configured to receive the continuous, compressed slab 2042 of material into the cutting unit 2032, while the slab 2042 is on the supporting structure 2016, and cut the continuous, compressed slab 2042 of material to desired lengths (e.g., as generally described in connection with step 814 of method 800, etc.). In the illustrated embodiment, the cutting unit 2032 includes a cutting blade 2034 configured to move in the Z direction (e.g., vertically via actuator 2036, etc.) to cut the continuous, compressed slab 2042 of material to desired lengths (where each of the cut lengths of the slab 2042 is uncured).

Finally in the system 2000, the cut lengths of the slab 2042 of material are transported from the supporting structure 2016 to a finishing station 2038 where the cut slabs are vacuum compacted (e.g., via a vacuum compacted machine, etc.) and then cured (e.g., in an oven, kiln, etc.) to form cured slabs (e.g., engineered stone slabs, etc.). The cured slabs may then be further processed as desired (e.g., cooled (e.g., in a cooling tower, etc.), trimmed to size, ground down to desired thickness, polished, etc.).

Figure 23:
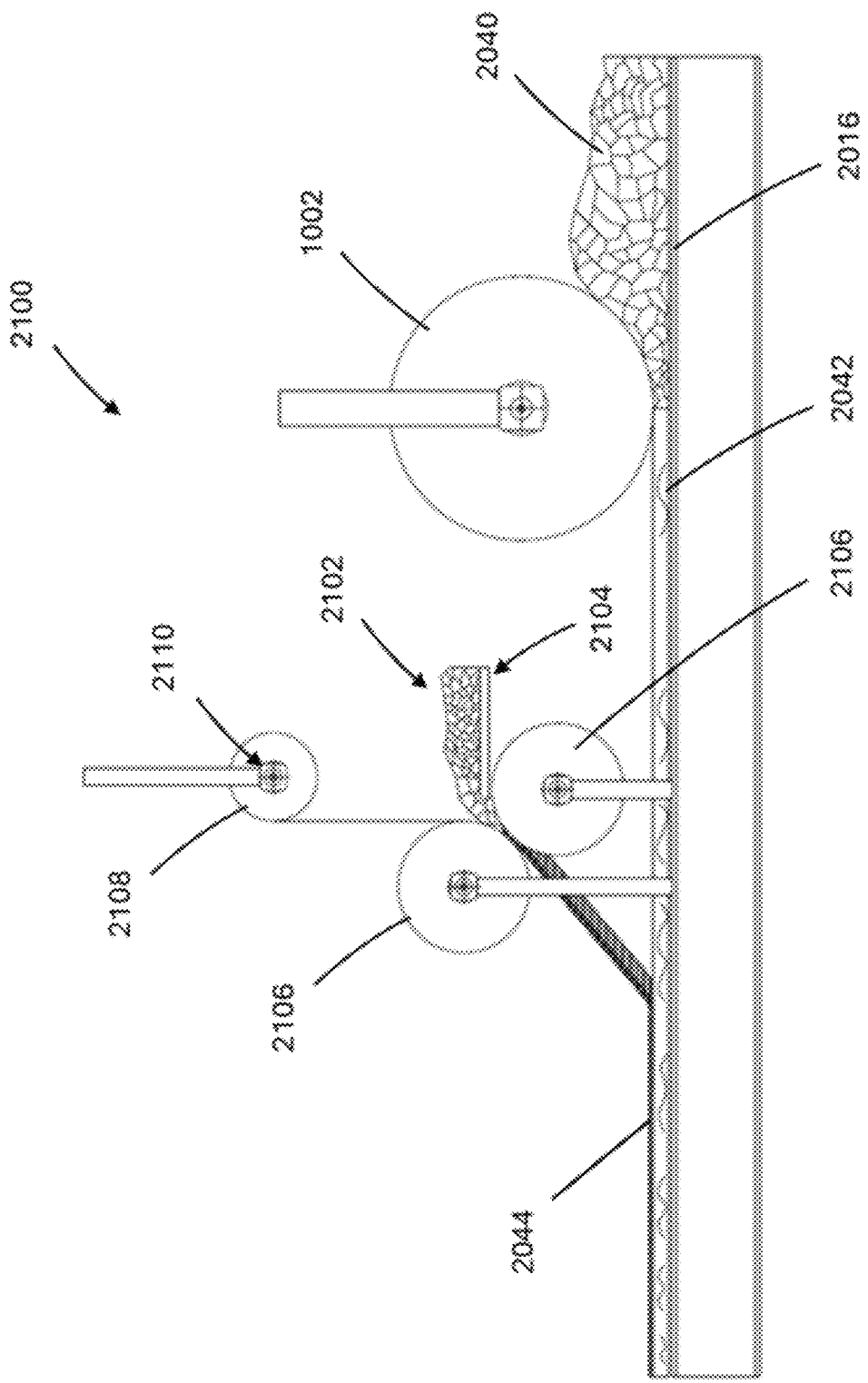
FIG. 23 shows a side view of an example assembly configured to apply an additional layer of material (e.g., a protective layer of material, a layer of second material, etc.) to a continuous, compressed slab of material formed as described in FIG. 22.

FIG. 23 illustrates an example assembly 2100 that may be included in the system 2000 to add an additional layer of material 2102 (e.g., a protective layer of material, a layer of second composite material, etc.) to the continuous, compressed slab 2042 of material after the slab 2042 exits the second compressing unit 2030 (e.g., roller 1002, etc.) and before the slab is transported to the cutting unit 2032.

As shown, the assembly 2100 includes second material 2102 stored at platform 2104 (broadly, a storage unit, etc.). The platform 2104 is configured to feed the second material 2102 to a pair of press rollers 2106. The press rollers 2106 are configured to press the second material 2102 into a generally consistently thick and dense layer configured to be laid on top of the continuous, compressed slab 2042 of material as the slab 2042 leaves the press roller 1002 of the second compressing unit 2030 (which, as described, operates to compress the fragments 2040 into the continuous, compressed slab 2042 of material). In at least one embodiment, the pair of press rollers 2106 may be a single press roller.

The assembly may also include a supply of PET film 2108. In connection therewith, the PET film 2108 is fed (via a roller 2110, etc.) to the press rollers 2106 whereby the second layer (or layer of second material 2102) is pressed together with the PET film 2108 (e.g., to a substantially same thickness and/or density, etc.) to inhibit the second material 2102 included in the second layer from breaking (before being applied to the continuous, compressed slab 2042 of material). The press rollers 2106, then, direct the layer of second material 2102 and PET film 2008 (identified together as layer 2044 in FIG. 23) onto the upper surface of the continuous, compressed slab 2042 of material (whereby the layer of second material 2102 and the PET film 2008 (as the second layer 2044) are laid generally evenly on top of the continuous, compressed slab 2042 of material), on the supporting surface 2016. The supporting surface 2016 then transports the layered materials to the cutting unit 2032, to cut the combined slab into a specified length, then the slab is transferred into the vacuum compacting machine to be compacted as generally described above (at least part of the PET film 2008 may then be removed from the slab, as desired, after vacuum compacting as generally described herein (broadly, at least part of the second layer 2044 may be removed, etc.)).

Figure 24:
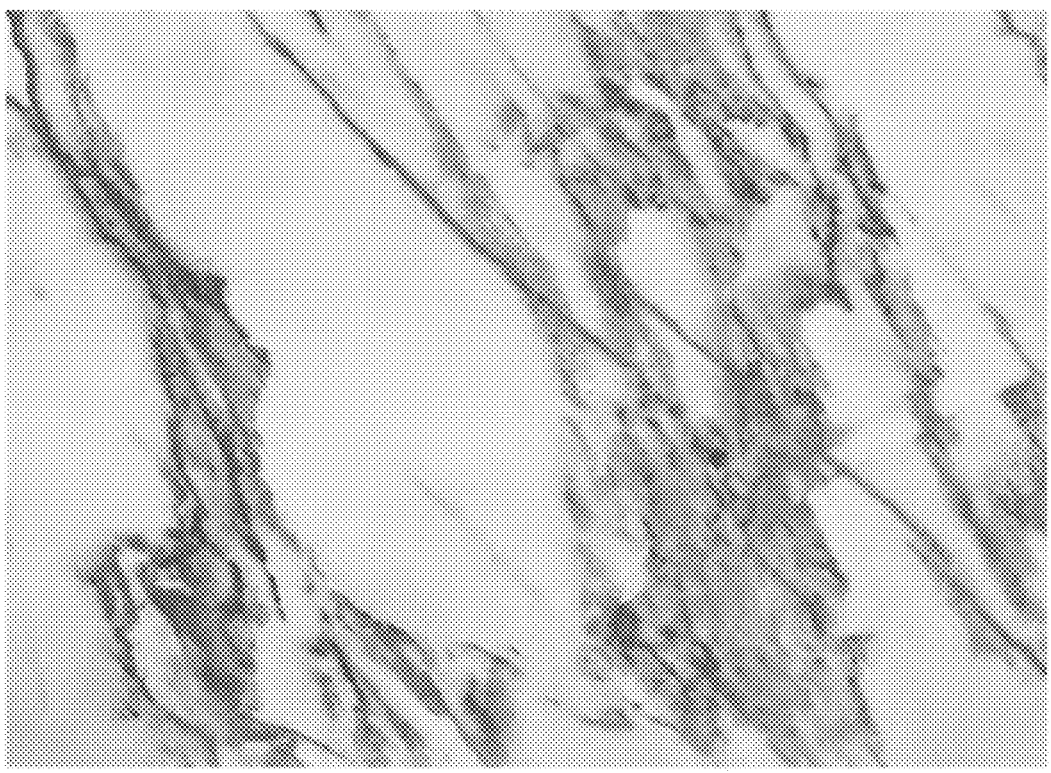
FIG. 24 shows an image of a natural stone slab, which may be used as input for applying colorant to fragments of material used to form an engineered slab herein.
Figure 25:
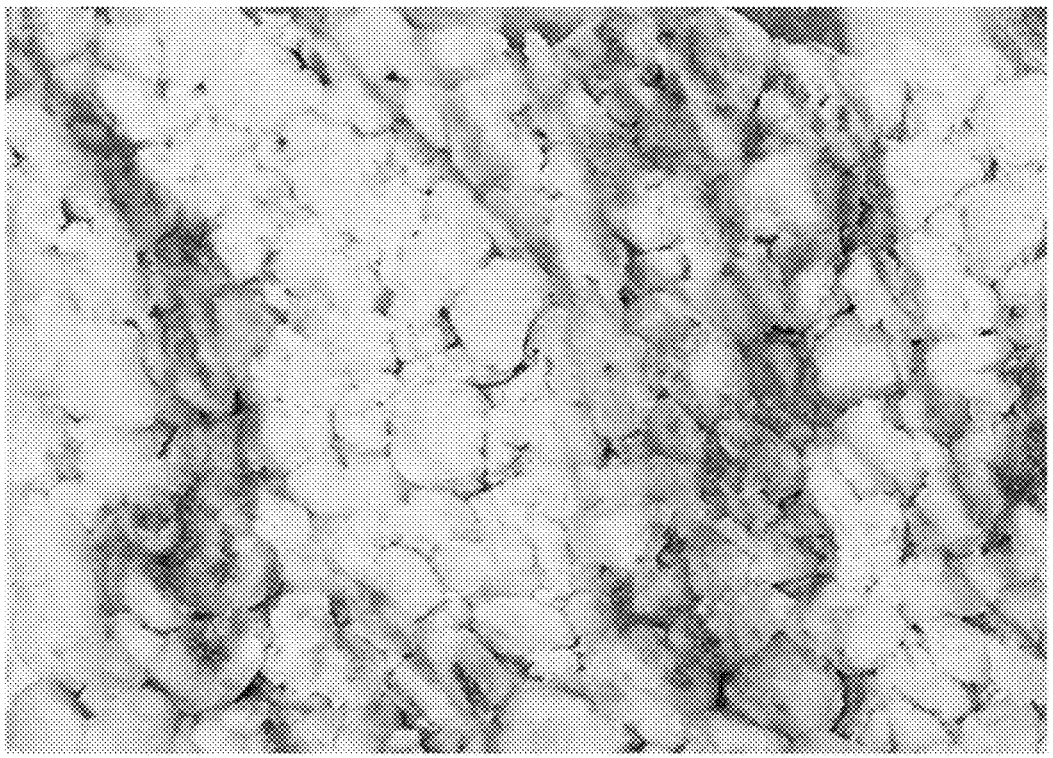
FIG. 25 shows an image of fragments of material on a supporting structure with colorant added thereto based on the image of the natural stone slab in FIG. 24.
Figure 26:
FIG. 26 shows an image of a cured engineered slab formed from the fragments of material in FIG. 25, where the engineered slab includes a vein pattern similar to the vein pattern of the natural stone slab in the image of FIG. 24.

FIGS. 24-26 illustrate the features of the present disclosure, in which an image of a natural stone may be used to generate a similar pattern in an engineered stone slab. In connection therewith, FIG. 24 illustrates an image of a desired pattern in natural stone to be implemented in the engineered stone slab. The image is mapped (e.g., the pattern in the image is mapped, etc.) to fragments on a supporting structure, and then, as shown in FIG. 25, colorant is applied to the fragments in accordance with the mapping (e.g., via a digital printing apparatus, manually, etc.). The fragments are then processed as described herein, to form an engineered stone slab, as shown in FIG. 26, having a vein pattern similar to that of the original image.

Figure 27:
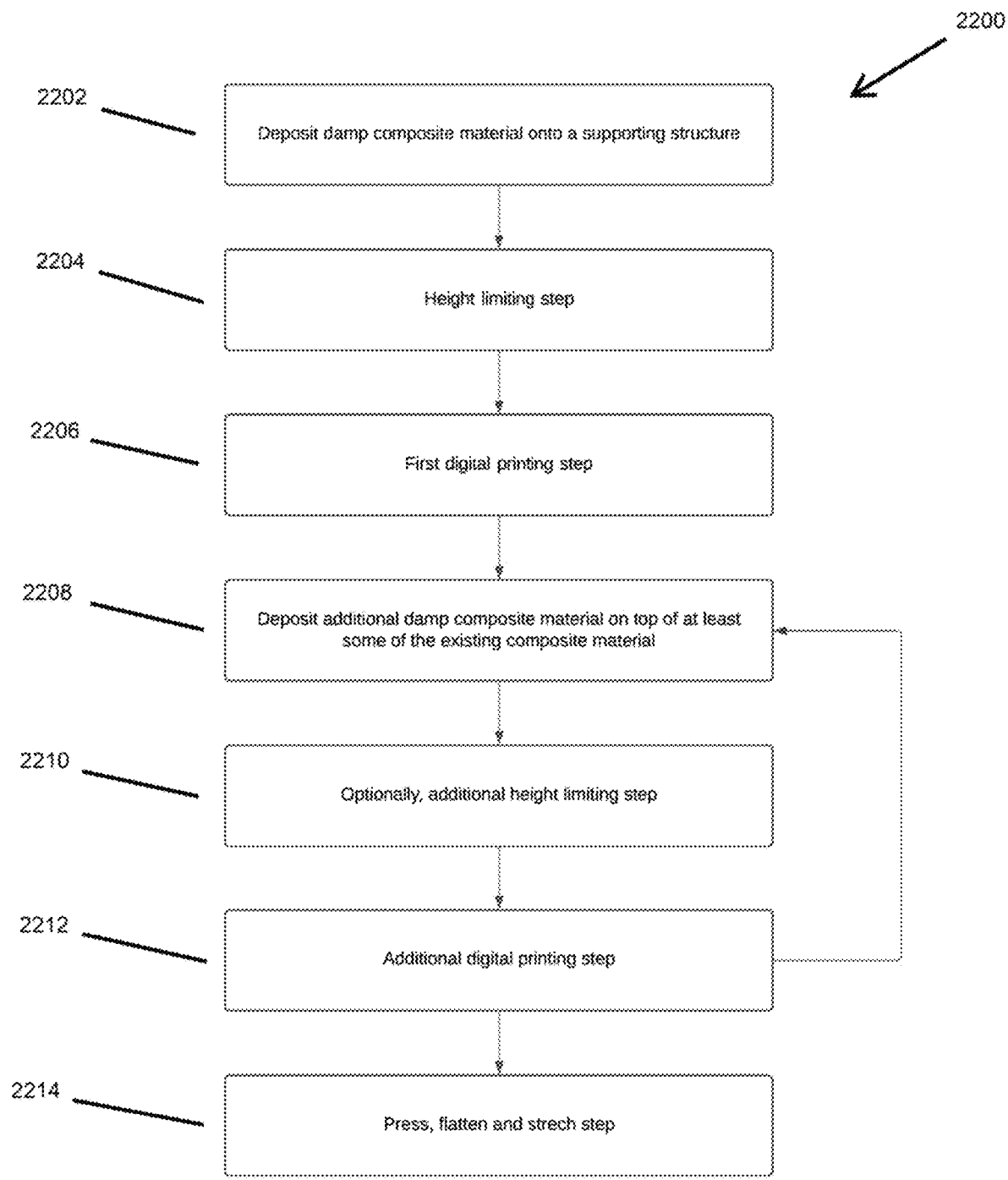
FIG. 27 shows a flow chart of a method in accordance with an embodiment of the present disclosure.

FIG. 27 shows an example process flowchart (or method) 2200 for producing an engineered stone slab in accordance with an embodiment of the present disclosure. At step 2202 of FIG. 27, composite material may be placed somewhat evenly on a supporting structure. The composite material may be formed by a process in which a plurality of randomly shaped fragments, in which the majority of the randomly shaped fragments by weight are of a desired size range, are obtained by a process of compressing and controllably fragmenting the composite material (e.g., as generally described herein, etc.). It should be noted that although the composite material or randomly shaped fragments may be placed somewhat evenly on the supporting structure, due to the variation in size and distribution of the composite material or randomly shaped fragments the top surface(s) will always be to a certain degree uneven.

At step 2204 of FIG. 27, in a first height limiting step, the composite material may then pass under a height limiting device which is set at a predefined height above the supporting structure. This height limiting device may slightly press and/or disrupt the top portions of the higher composite material or randomly shaped fragments so that the highest point(s) of the composite material or randomly shaped fragments is/are substantially the same height from the supporting structure as the height limiting device is from the supporting structure. An example distance by which the top portions of the higher composite material or randomly shaped fragments is compressed or disrupted may be about 3 mm-30 mm (e.g., from the highest point of the composite material or randomly shaped fragments as originally deposited onto the supporting structure, etc.). In addition, this height limiting action will reduce the height variation across the composite material or randomly shaped fragments, so that when additional composite material or randomly shaped fragments is added at a later step, some of the composite material or randomly shaped fragments will stay on top of the flattened area formed by the height limiting device and does not substantially move or settle to the lower points between the larger pieces of composite material or randomly shaped fragments. Examples of the height limiting device may be a roller configured to disrupt or compress the composite material or randomly shaped fragments or a scraper configured to disrupt or scrape the composite material or randomly shaped fragments. Disrupting may constitute flattening or compressing the composite material or randomly shaped fragments, breaking apart the composite material or randomly shaped fragments, pushing aside the composite material or randomly shaped fragments so higher portions fall to lower positions, or any combination of these actions to ensure the maximum height of the composite material or randomly shaped fragments is set properly.

At step 2206 of FIG. 27, in a first digital printing step, after passing underneath the height limiting device, the composite material or randomly shaped fragments may then have an image printed by having colorant deposited onto at least some of the flattened (or height limited) upper surfaces and/or onto at least some of the side walls of at least some of the composite material or randomly shaped fragments by a digital printing device. The height limiting device ensures that the composite material or randomly shaped fragments is/are at the appropriate height(s) so that none of the composite material or randomly shaped fragments comes into contact with the nozzle or nozzles of the digital printing device. In addition, this ensures that the distance between the nozzles and any given point of the composite material or randomly shaped fragments is as small as possible as to not negatively affect the resolution of the digital printing. Since the digital printing device is depositing colorant onto an uneven surface, the further the surface is from the nozzle or nozzles of the digital printing device, the blurrier or less resolution the printed region will be.

At step 2208 of FIG. 27, the composite material or randomly shaped fragments on the supporting structure (e.g., a first layer of material on the supporting structure, etc.) may then have an additional layer of composite material or randomly shaped fragments deposited on top of at least some of the composite material or randomly shaped fragments coated with colorant from the digital printing device already on the supporting structure (e.g., the additional layer of composite material or randomly shaped fragments may be deposited onto the first layer of material already on the supporting structure, etc.). An example amount of additional composite material or randomly shaped fragments deposited may be about 3%-20% by weight of the initial amount of composite material or randomly shaped fragments initially deposited on the supporting structure. The additional composite material or randomly shaped fragments may be deposited with a majority of the fragments by weight having a diameter of, for example, between about 5 mm-35 mm.

At step 2210 of FIG. 27, in an optional additional height limiting step, the composite material or randomly shaped fragments may pass under a height limiting device (e.g., a second height limiting device, etc.) which is set at a predefined height above the supporting structure. The height limiting device may slightly press and/or disrupt the top portions of the higher composite material or randomly shaped fragments so that the highest point(s) of the composite material or randomly shaped fragments is/are substantially the same height (or distance from the supporting structure) as the height limiting device is from the supporting structure. Again, examples of the height limiting device may be a roller to disrupt or compress the composite material or randomly shaped fragments or a scraper to disrupt or scrape the composite material or randomly shaped fragments. Disrupting may constitute flattening or compressing the composite material or randomly shaped fragments, breaking apart the composite material or randomly shaped fragments, pushing aside the composite material or randomly shaped fragments so higher portions fall to lower positions, or any combination of these actions to ensure the maximum height of the composite material or randomly shaped fragments is set properly.

At step 2212 of FIG. 27, in an additional digital printing step (e.g., a second digital printing step, etc.), the composite material or randomly shaped fragments on the supporting structure may have an image printed thereon by having colorant deposited on at least part of the side walls (and on at least part of the flattened upper surface(s)) of some of the composite material or randomly shaped fragments by a digital printing device. The height limiting device (e.g., as part of the optional additional height limiting step, etc.) ensures that the composite material or randomly shaped fragments is/are at the appropriate height so that none of the composite material or randomly shaped fragments comes into contact with the nozzle or nozzles of the printing device. In addition, this ensures that the distance between the nozzles and any given point of the composite material or randomly shaped fragments is as small as possible as to not negatively affect the resolution of the print. Optionally, this additional printing step may print substantially the same pattern or design as the first printing step, so the same region of the different/additional layers of composite material or randomly shaped fragments has the same colorant or image.

In this manner, at least some portions (e.g., layers, etc.) of the additional composite material or randomly shaped fragments deposited on the supporting structure may have colorant deposited underneath and on top of it by a printing device or devices, in addition to coating at least part of the side walls. This process of steps 2204-2212 may be repeated as many times as required by the desired final aesthetic.

At step 2214 of FIG. 27, the composite material or randomly shaped fragments may be pressed, flattened and stretched into an uncured slab by means of a press roller or pair of press rollers (as generally described herein). And, the uncured slab may then be cured (as also described herein).

Figure 28:
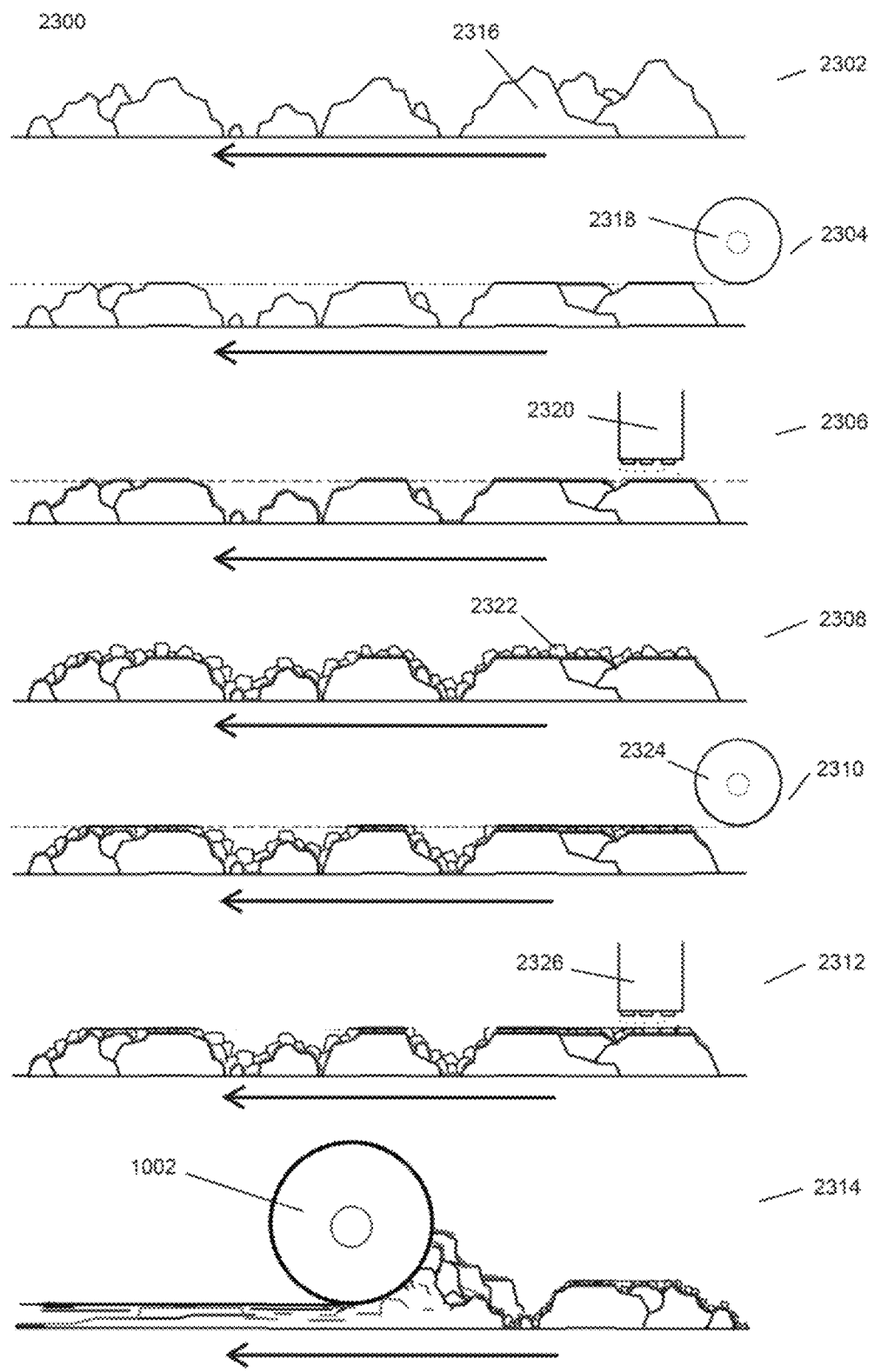
FIG. 28 shows a side view of the composite material or randomly shaped fragments in various steps in accordance with the flow chart in FIG. 27.

FIG. 28 shows a side view for each of steps 2302-2314 associated with an example process 2300 of the present disclosure for producing an engineered stone slab (and generally corresponding to the steps 2202-2214 of method 2200). An arrow is included in each of the views to illustrate movement of the material (and supporting structure) therein.

At step 2302 of FIG. 28 (generally corresponding to step 2202 of FIG. 27), the composite material or randomly shaped fragments 2316 are deposited onto a supporting structure. As described herein, in example embodiments the majority of the randomly shaped fragments included in the composite material, by weight, are of a desired size range and are obtained by a process of compressing and controllably fragmenting the composite material.

At step 2304 of FIG. 28 (generally corresponding to step 2204 of FIG. 27), in the first height limiting step, the composite material or randomly shaped fragments deposited on the supporting structure are moved (or passed) through a height limiting device 2318. As shown, the top peaks of at least some of the composite material or randomly shaped fragments have been flattened (e.g., to form flat upper surfaces or plateaus, etc.).

At step 2306 of FIG. 28 (generally corresponding to step 2206 of FIG. 27), in the first digital printing step, the composite material or randomly shaped fragments on the supporting structure have colorant deposited on top and/or on the side walls of at least some of the composite material or randomly shaped fragments by a digital printing device 2320. As can be seen, the upper flattened surfaces of the composite material or randomly shaped fragments are spaced about the same distance away from nozzles of the digital printing device 2320.

At step 2308 of FIG. 28 (generally corresponding to step 2208 of FIG. 27), the additional layer of composite material or randomly shaped fragments 2322 is deposited on top of at least some of the composite material or randomly shaped fragments already on the supporting structure (and which have been coated by colorant at step 2306). As such, the additional layer of composite material or randomly shaped fragments 2322 are also deposited on top of the colorant that was added/printed at step 2306 (e.g., such that the colorant is disposed (or sandwiched) between the composite material or randomly shaped fragments 2316 (or first layer of composite material or randomly shaped fragments) and the additional composite material or randomly shaped fragments 2322 (or second layer of composite material or randomly shaped fragments), etc.).

At step 2310 of FIG. 28 (generally corresponding to step 2210 of FIG. 27), in the optional additional height limiting step, the additional layer of composite material or randomly shaped fragments have the top peaks of at least some of the additional layer of composite material or randomly shaped fragments flattened by a height limiting device 2324 (e.g., by passing or moving the additional layer of composite material or randomly shaped fragments under the height limiting device 2324, etc.). The height limiting device 2324 may be the same device (or the same type of device) or a different device as height limiting device 2318.

At step 2312 of FIG. 28 (generally corresponding to step 2212 of FIG. 27), in the additional digital printing step, the additional layer of composite material or randomly shaped fragments have colorant deposited on top and/or on the side walls of at least some of the additional composite material or randomly shaped fragments by a digital printing device 2326. Digital printing device 2326 may be the same device (or same type of device) or a different device as digital printing device 2320. Again, as shown, the upper flattened surfaces of the composite material or randomly shaped fragments 2322 are spaced about the same distance away from nozzles of the digital printing device 2326.

At step 2314 of FIG. 28 (generally corresponding to step 2214 of FIG. 27), the combination of layers undergoes a process of being pressed, flattened and stretched into an uncured slab by means of a press roller or pair of press rollers 1002 (as generally described herein).

Although the disclosure has been described by reference to particular illustrative embodiments thereof, many changes and modifications of the disclosure may become apparent to those skilled in the art without departing from the spirit and scope of the disclosure. It is therefore intended to include within this patent all such changes and modifications as may reasonably and properly be included within the scope of the present disclosure's contribution to the art.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" as well as the phrase "at least one of" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper", "lower" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the present disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the present disclosure, and all such modifications are intended to be included within the scope of the present disclosure.

What is claimed is:

1. A method for producing engineered stone slabs, the method comprising the steps of:
    compressing a damp composite material to form compressed composite material;
    fragmenting the compressed composite material into a plurality of fragments of the composite material;
    depositing at least some of the plurality of fragments onto a surface, which is supported by a supporting structure; and then
    using a height limiting device, in a height limiting step, to disrupt the plurality of fragments so a height of the fragments at the highest point from the supporting structure is substantially the same height as the height limiting device from the supporting structure; and then
    using a digital printing device, in a first digital printing step, to print an image onto at least part of a top and side walls of at least some of the plurality of fragments; and then
    depositing additional damp composite material onto at least some of the plurality of fragments; and then
    using a digital printing device, in an additional digital printing step, to print an image onto at least part of at least some of the additional damp composite material; and then
    using a press roller to press, flatten and stretch the plurality of fragments into a slab.

2. The method of claim 1, wherein after depositing additional damp composite material onto at least some of the plurality of fragments, using another height limiting device, in an additional height limiting step, to disrupt the additional damp composite material so the height of the plurality of fragments and additional composite material at the highest point from the supporting structure is substantially the same height as the another height limiting device from the supporting structure.

3. The method of claim 1, wherein after the additional digital printing step, the step of depositing additional damp composite material and the additional digital printing step are repeated.

4. The method of claim 1, wherein the image printed in the additional digital printing step is substantially the same as the image printed in the first digital printing step, and printed on top of the image printed in the first digital printing step.

5. The method of claim 1, wherein the first digital printing step and the additional digital printing step both print the respective image by depositing colorant in predefined regions over the supporting structure.

6. The method of claim 5, wherein the colorant is in a liquid form.

7. The method of claim 5, wherein the colorant is in a particle form.

8. A method for producing engineered stone slabs, the method comprising:
    depositing fragments of composite material onto a surface;
    flattening at least some of the fragments on the surface, using a height limiting device, so that a height of the flattened fragment(s) relative to the surface is substantially the same as a height of the height limiting device relative to the surface; and then printing a first image onto at least part of the fragments on the surface; and then depositing additional composite material onto at least some of the fragments and the image printed onto at least part of the fragments; and then printing a second image onto at least part of the additional composite material on the surface; and then using a press roller to press, flatten and stretch the fragments of composite material and the additional composite material into a slab.

9. The method of claim 8, wherein the first image and the second image are the same.

10. The method of claim 8, further comprising, after depositing the additional composite material, flattening the additional composite material, using a second height limiting device, so that a height of the flattened fragment(s) and the additional composite material deposited on the flattened fragment(s) relative to the surface is substantially the same as a height of the second height limiting device relative to the surface.

\* \* \* \* \*